Dec. 6, 1966     P. J. CORAZZO     3,289,552
PAPER CUP MAKING MACHINE

Filed March 5, 1963     10 Sheets-Sheet 1

INVENTOR.
PAUL J. CORAZZO

BY
McCormick, Paulding & Huber
ATTORNEYS

Dec. 6, 1966 P. J. CORAZZO 3,289,552
PAPER CUP MAKING MACHINE
Filed March 5, 1963 10 Sheets-Sheet 4

Dec. 6, 1966 P. J. CORAZZO 3,289,552
PAPER CUP MAKING MACHINE
Filed March 5, 1963 10 Sheets-Sheet 5

Dec. 6, 1966   P. J. CORAZZO   3,289,552
PAPER CUP MAKING MACHINE
Filed March 5, 1963   10 Sheets-Sheet 7

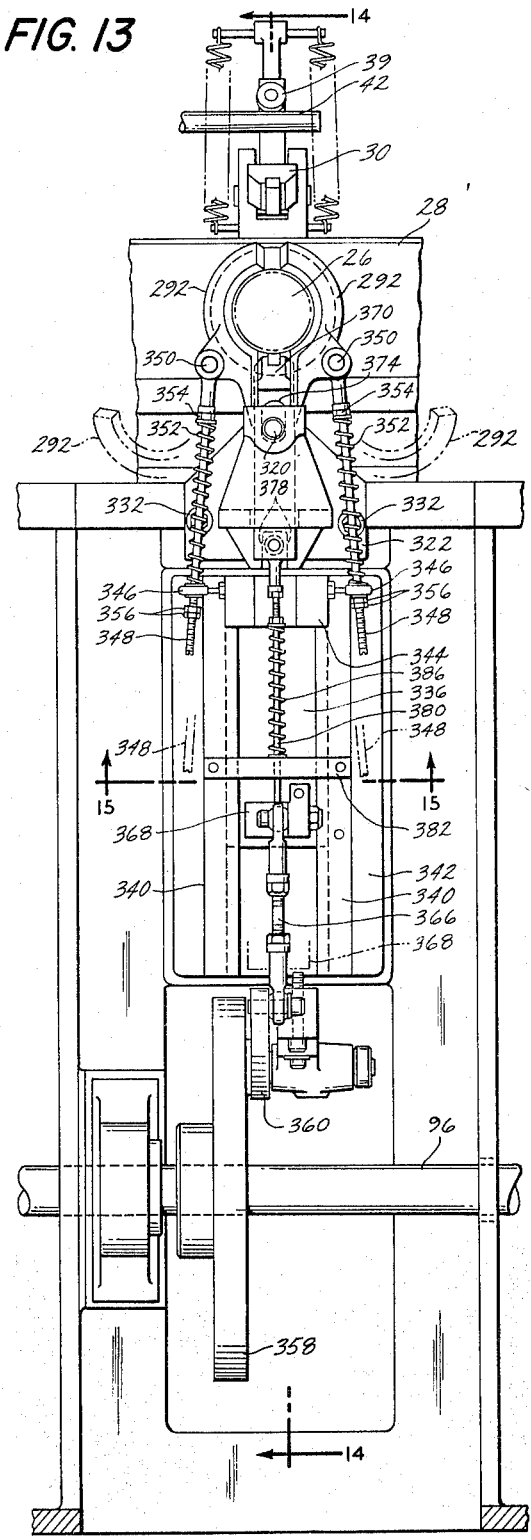
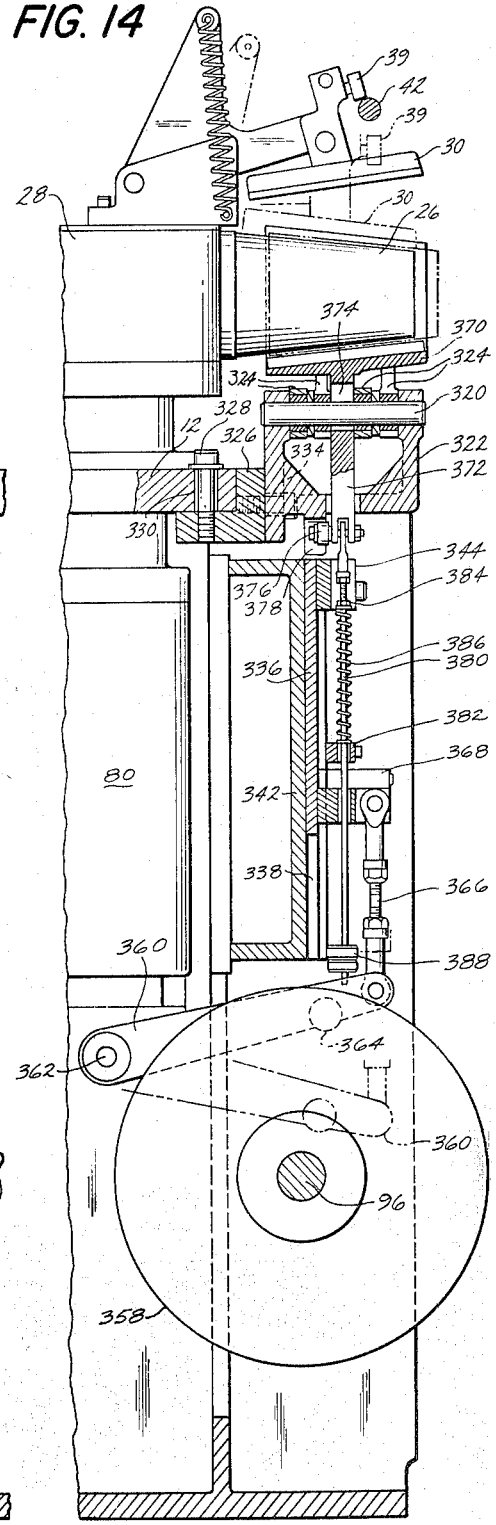

Dec. 6, 1966  P. J. CORAZZO  3,289,552
PAPER CUP MAKING MACHINE
Filed March 5, 1963  10 Sheets-Sheet 9

3,289,552
PAPER CUP MAKING MACHINE
Paul J. Corazzo, New Britain, Conn., assignor to Sherwood Tool Incorporated, Kensington, Conn., a corporation of Connecticut
Filed Mar. 5, 1963, Ser. No. 263,011
23 Claims. (Cl. 93—39.3)

This invention relates to a single wrap paper cup making machine, and deals more particularly with such a machine for making flat bottomed cups and of the type in which paper blanks eventually comprising the side walls of the cups are wrapped around male mandrels carried by a revolving turret past various work stations whereat the side wall blanks are processed and united with other blanks, eventually comprising the bottoms of the cups, to form partially completed cups which are thereafter transferred to female receivers or dies carried by a second turret, such receivers carrying the cups past other work stations at which the cups are finished.

The general organization of a machine embodying the present invention is in many respects similar to that shown in the patent to Wessman et al., Re. 21,072, to which reference is made for a detailed discussion of the various operations performed by the machine. One major difference between the Wessman et al. machine and that of the present invention is, however, the fact that in the machine of the present invention the second turret is mounted at the same elevation as the first turret and the cup receivers carried by the second turret are mounted with their axes horizontal so that the partially completed cups in moving from the male mandrels to the cup receivers move only a relatively short distance and in a straight line. Another difference is that in the embodiment of the present invention illustrated herein the sidewall blanks are precut and stacked and then fed individually to the male mandrels by a feed roll mechanism generally similar to that shown by the patent to Cooley, No. 1,973,406. It is to be understood, however, that various features of the present invention, such as various subcombinations defined by the subjoined claims, are not necessarily limited to use in conjunction with the exact arrangement of components shown and described herein and may be used as part of other arrangements as well.

The general object of this invention is to provide an improved machine of the general type set out above, the improvements in the machine resulting in faster operation, simplified construction, reduced maintenance and down time, easy access to various parts for replacement and repair, fewer rejects and a superior finished product as compared to prior machines.

Another more specific object of the invention is to provide an improved mechanism for cutting and forming bottom blanks from a web of paper and including an improved feed means for intermittently feeding a length of the web to the cutting die, the length of web which is fed with each cycle of the feed means being accurately determined and sufficient to assure the blanking of a complete bottom blank with each operation of the cutting die, thereby diminishing the possibility of leaking or reject cups formed as a result of the use of incomplete bottom blanks.

Another object of this invention is to provide an improved means for positioning the sidewall blanks relative to the male mandrels before the blanks are clamped to and folded around the mandrels, such positioning means serving to accurately locate the blanks relative to the mandrel so that upon being folded the two overlapped edges forming the side seam are brought into exacting longitudinal register with one another. In keeping with this object of the invention, a more specific object is to provide a sidewall blank positioning mechanism of the foregoing character which is compatible with a folding mechanism of the type including two pivotally supported arcuate folding wings which wings are of such arcuate length as to collectively embrace substantially the entire circumference of the folded sidewall blanks when closed on a male mandrel.

Another object of the present invention is to provide a sidewall blank folding mechanism of the character set forth in the preceding paragraph and including improved means for supporting and actuating the folding wings and the bottom clamp whereby the folding wings may be adjusted relative to the frame of the machine to bring the pivot point of the same into an initial accurate and optimum position relative to the male mandrels and which position is thereafter maintained during the operation of the machine to assure repetitive proper folding.

A further object of the invention is to provide in a cup making machine of the foregoing character an improved means for indexing the two turrets whereby the latter are accurately located relative to each other and to the other parts of the machine during each dwell period of their movement.

Other objects and advantages of the invention will be apparent from the following description and from the drawings forming a part hereof.

The drawings show a preferred embodiment of the invention and such embodiment will be described, but it will be understood that various changes may be made from the construction disclosed, and that the drawings and description are not to be construed as limiting the scope of the invention, the claims forming a part of this specification being relied upon for that purpose.

Of the drawings:

FIG. 13 is a front elevational view of the sidewall blank folding mechanism.

FIG. 14 is a vertical sectional view taken generally on the line 14—14 of FIG. 13.

*General organization*

Figure 1:
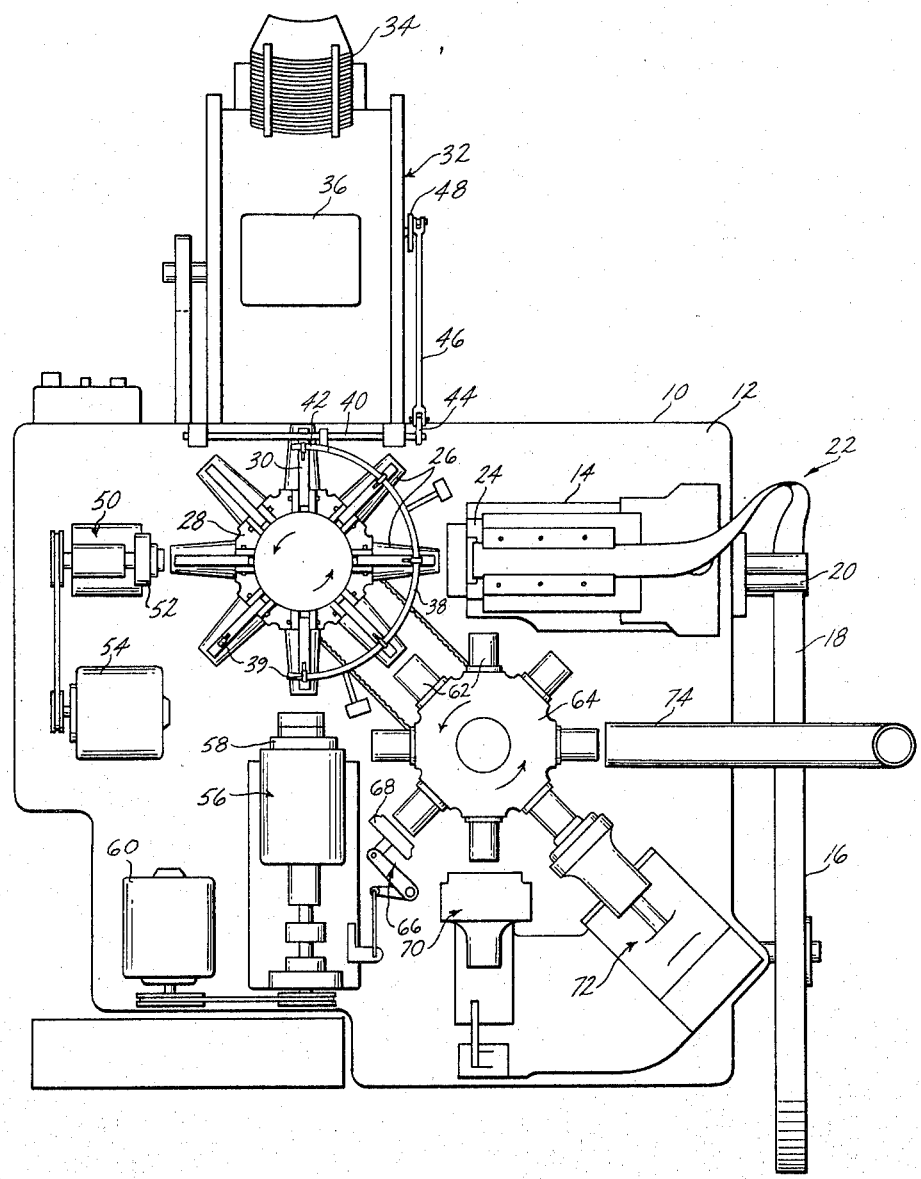
FIG. 1 is a schematic plan view of a paper cup making machine embodying the present invention and which view shows the general organization of various major components of the machine.
Figure 2:
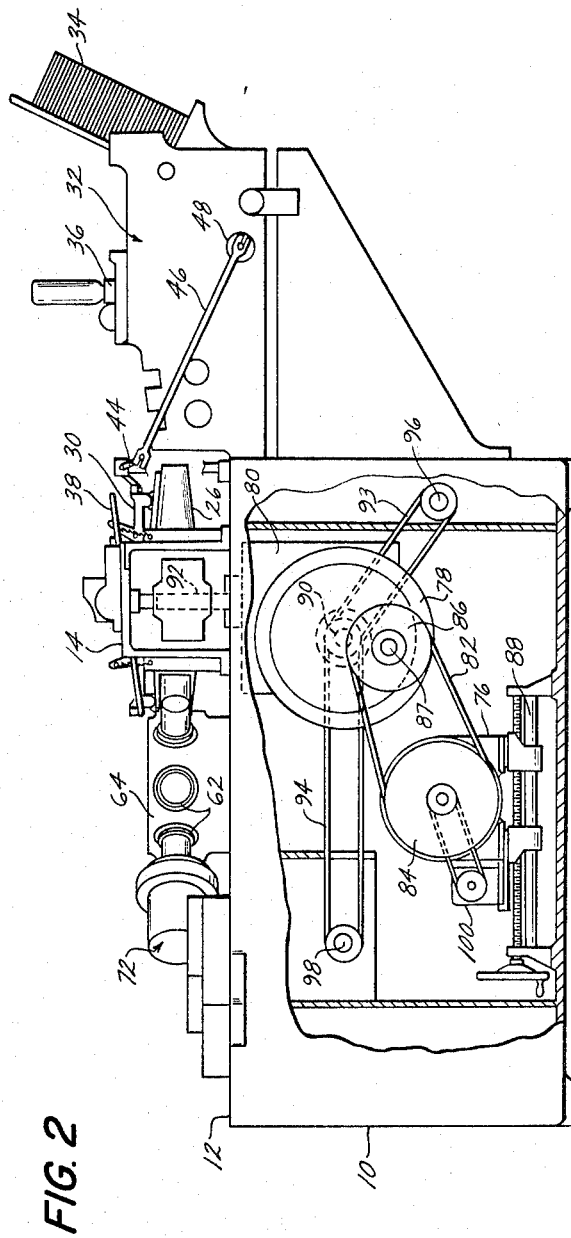
FIG. 2 is a schematic side elevational view of the machine shown in FIG. 1 and which view shows the general organization of other major components of the machine.

Reference is made to FIGS. 1 and 2 for an understanding of the general organization of the various components making up the machine of the present invention, and of the various operations performed by said machine. As shown, the machine includes a frame 10 providing a raised flat table surface 12. Generally speaking, the parts which operate directly on the paper blanks and web fed into the machine are located above the table surface 12 while the various drive means for operating such parts in proper timed relationship to each other are located below the table surface 12.

Referring more particularly to FIG. 1, the first operation in making a cup is performed by a bottom blanking and forming unit 14. This unit operates on paper web or tape 18 supplied from a roll of the same rotatably supported from one side of the frame 10, and when the machine is in operation the web 18 is continuously pulled from the roll 16 by an unwinding unit 20. The web which leaves the unit 20 forms a free or loose loop 22 having its end portion received in a feeder 24 associated with the blanking and forming unit 14. The feeder 24 operates intermittently to feed lengths of the web 18 into the blanking and forming unit, the lengths being of sufficient size to permit the cutting of circular bottom blanks therefrom. The unwinding unit 20 may be of various suitable constructions, but preferably consists of two rotatable rolls between which the web is squeezed. One of the rolls is driven so as to pull the web from the roll and preferably its speed is adjustable to allow the operator to adjust the unwinding speed so that the free loop 22 is maintained without becoming excessively long. Also, the unwinding unit 20 preferably includes means whereby the operator may adjust the same to temporarily interrupt the unwinding of the web from the roll 16 while the intermittent feeder 24 remains in operation, thereby allowing the feeder 24 to reduce the length of the free loop 22 if its length does become excessive.

After a length of the web 18 is fed by the feeder 24 into the bottom blanking and forming unit 14 the latter unit operates to cut a circular blank from the web and to form the cut blank to provide the same with a generally cylindrical flange or skirt about its periphery and extending in one direction generally perpendicularly from the main portion of the blank. This formed blank is then moved forwardly or to the left in FIG. 1 from the bottom blanking and forming unit 14 to the hollow outer end of a male mandrel 26 aligned with the forward end of the unit.

The latter male mandrel 26 is carried by a turret 28 supported for rotation about a vertical axis and carrying a total of eight equally spaced male mandrels 26, 26. The turret 28 is driven by an indexing drive which throughout the drive or indexing portions of each cycle of operation moves the turret 28 through one eighth of a revolution about its vertical axis and which during the dwell portion of each cycle of operation accurately locates the male mandrels relative to the bottom blanking and forming unit 14 and other components of the machine hereinafter described.

After a formed bottom blank is transferred to the adjacent male mandrel 26 the turret 28 is indexed one eighth turn, or 45°, in the counterclockwise direction as viewed in FIG. 1. This brings the male mandrel to an idle position whereat no operation is performed with regard to the mandrel. The next indexing movement, however, brings the mandrel into alignment with a work station whereat side wall blanks are fed to the mandrel, coated with glue along the appropriate edges, positioned accurately beneath the mandrel, folded around the mandrel to bring the side edges into overlapping relationship and then clamped to the mandel by an upper clamp 30. In FIG. 1 the unit for feeding side wall blanks to the male mandrels is indicated generally at 32. A stack 34 of side wall blanks is placed in a carrier at the rear end of the unit 32 and the latter unit operates to individually withdraw blanks from the bottom of the stack and by means of rolls to feed the same forwardly to the male mandrels. As the blanks do so pass forwardly through the unit 32, a gummer, indicated generally at 36, operates to apply glue to the side and bottom edges of each blank. After a blank reaches the forward or inner end of the feed unit 32 it enters a guide and positioning unit which accurately locates the blank with respect to the adjacent mandrel 26. A bottom clamp is then operated to temporarily hold the side wall blank to the mandrel while a pair of folding wings close about the mandrel and in so closing wrap the blank tightly around the outer surface of the mandrel to bring the side edges of the blank into overlapped relationship. The guide and positioning unit for the blank, the bottom clamp and the folding wings are not shown in FIG. 1, but are described in detail hereinafter in connection with other figures. The means for withdrawing the blanks from the stack 34, the feeder 32 and the gummer 36 by themselves form no part of the present invention and suitable constructions of these devices are well known in the art so that no further description of them is necessary.

As mentioned, after a side wall blank is folded on the male mandrel an upper clamp 30 is operated to engage the blank along the overlapped side edges to hold the folded blank to the mandrel. It also applies pressure to the overlapped edges to aid in setting the glue applied to said edges. A clamp 30 is associated with each of the mandrels 26 and moves with the turret 28, each clamp being supported for pivotal movement relative to the turret about a horizontal axis and spring biased toward the associated mandrel. The means for operating the clamps includes a substantially semicircular track 38 which is fixed to the frame 10 by suitable standards so as to be disposed above the male mandrels 26, 26. The track 38 is inclined upwardly in the direction of the turret movement and is engaged by lifting rollers 39 or similar elements carried by the clamps. As the male mandrels are moved counterclockwise by the indexing movement of the turret 28 the lifting rollers 39 move upwardly along the guide track 38 to raise the associated clamps from the surface of the associated mandrels. At the work station occupied by the blank feed unit 32 is a mechanism for lowering each clamp 30 to the associated mandrel 26 at the proper time, this mechanism including a horizontal rod 40 rotatably supported above the mandrels 26 and carrying an arm fixed thereto and having an arcuate outer portion 42 movable between raised and lowered positions in response to rotation of the shaft 40 between first and second angular positions. In its raised position the arcuate portion 42 forms a continuation of the track 38. At one end of the shaft 40 is another arm 44 which is fixed to the shaft and operated by a link 46 reciprocated by a cam 48 driven in unison with the feed rolls of the feed unit 32. The timing of the cam 48 is such as to reciprocate the link 46 to move the shaft 40 to lower the arcuate portion 42 and the associated clamp 30 at the proper time as determined by the operation of the folding wings.

After the folding of a side wall blank on the male mandrel 26 at the last-mentioned station, the turret 28 is again indexed to bring the mandrel to an idle station, and then again indexed to bring the mandrel into alignment with a bottom crimper 50. Before considering the operation of the crimper, however, it should be noted that as the male mandrel 26 leaves the work station of the blank feed unit 32 the side wall blank folded on the mandrel extends some distance beyond the outer end of the mandrel, and that the bottom blank positioned within the hollow outer end of the mandrel is located entirely within such hollow end. As the mandrel indexes from the feed unit 32 to the bottom crimper 50 a plunger in the male mandrel pushes the bottom blank some distance outwardly until its cylindrical skirt or flange projects outwardly beyond the outer end of the mandrel and engages or at least substantially engages the inner surface of the folded side wall blank. This outward movement of the bottom blank is, however, such that after the bottom blank is moved outwardly to its maximum position the side wall blank still extends outwardly a substantial distance beyond the skirt of the bottom blank. The bottom crimper 50 in turn includes an operating head 52 which is rotated by an associated drive motor 54 and which is moved into and out of engagement with the blank on the associated male mandrel by a suitable reciprocating drive mechanism located generally below the table 12. When the operating head 52 is brought into operating engagement with the blank, it operates to bend or crimp the bottom edge of the side wall blank inwardly and over the cylindrical skirt of the associated bottom blank. The crimper by itself forms no part of the present invention and since suitable crimpers are well known in the art no further description of this unit is deemed necessary.

The crimping or bending performed by the crimper 50 is a relatively rough operation and thereafter the mandrel is moved, by two indexing movements, into alignment with a bottom smoothing or roll-out unit 56 which operates on the bottom of the cup to smooth or iron out the wrinkles in the bent-over portion of the side wall blank and to press the same into firm engagement with the cylindrical skirt of the bottom blank to produce an attractive appearance, to provide a tight seal and to aid in setting the glue previously applied to the bottom edge of the side wall blank by the gummer 36. The bottom smoothing unit 56 includes an operating head 58 which is driven by an associated motor 60. The head 58 is movable horizontally into and out of operative relationship with the blanks on the associated mandrel 26 by a suitable reciprocating drive mechanism located generally beneath the table 12. The smoothing unit also by itself forms no part of the present invention and may be any one of several various different constructions well known in the art.

After the smoothing operation is performed by the unit 56 the turret 28 is indexed one more step to bring the mandrel under discussion to a transfer station and into alignment with a cup receiver 62 carried by a second turret 64 supported for rotation about a vertical axis. Eight cup receivers 62, 62 are carried by the turret 64, and the latter turret is indexed in unison with the first turret 28 so that during each dwell period one male mandrel 26 is aligned with an associated cup receiver 62 as shown in FIG. 1. At the time a male mandrel is aligned with a cup receiver 62 the associated clamp 30 is raised by the track 38 from the partially formed cup on the male mandrel and thereafter compressed air is introduced through the male mandrel to the inside cup so that the latter is blown in a straight line to the awaiting cup receiver 62.

After receiving a partially completed cup at the transfer station a receiver after two indexes of the turret 64 is brought into alignment with a cup seater 66 having a head 68 which during the following dwell period of the turrets moves forwardly toward the cup receiver to push the partially formed cup into properly seated relationship with the receiver and thereafter returns to its retracted position. As shown in FIG. 1 the cup seater 66 is connected by a linkage arrangement with the bottom smoothing unit 56 so that the cup seater head 68 is moved by and in unison with the reciprocating movement of the unit 56.

Another index of the second turret 64 brings the cup receiver and its partially formed cup into alignment with a beader 70 which when moved forwardly into engagement with the cup operates to roll a bead on the top end of the cup. After this beading operation is performed another index of the turret 64 brings the cup into alignment with a lid seating unit 72 which operates when brought into engagement with the cup to form a lid seat in the top end of the cup. The lid seating unit 72 is however, optional and may be omitted in those cases where the finished cup is to be used without a lid. Both the beader 70 and the lid seater 72 are reciprocated horizontally into and out of operative engagement with the partially formed cups during the dwell periods of the turrets by suitable drive mechanism located beneath the table 12, and both units by themselves form no part of the present invention and may therefore be of constructions well known in the art.

The lid seating and top beading operations are the last operations performed on the cup, and one index after moving from the lid seating station the cup receiver is moved to a discharge station where the finished cup is blown from the receiver by a jet of compressed air into a discharge tube 74 which serves to guide the finished cup to a collecting device (not shown).

FIG. 2 is a side view illustrating schematically the basic drive mechanism for the machine, and referring to this figure it will be noted that the drive mechanism includes a motor 76, a speed reducer 78 and an indexing unit 80. The drive between the motor 76 and the gear reducer 78 is effected by a belt 82 and two variable speed pulleys 84 and 86 whereby the speed of the input shaft 87 of the speed reducer 78 may be varied by moving the motor back and forth on an adjustable mount 88, thus varying the effective diameters of the variable speed pulleys 84 and 86 as is well known in the art. The indexing unit 80 is of the type having a horizontal input or drive shaft and a vertical indexing output shaft, and is preferably of the cam operated variety such as manufactured by Commercial Cam and Machine Company of Chicago, Illinois, and referred to as their index drive assembly Model CCM. In FIG. 2 the input or drive shaft for the index unit 80 is shown at 90 and the output or indexing shaft which extends upwardly through the center of the first turret 28 is shown at 92.

The speed reducer 78 is connected at one end of the shaft 90 and on the other end of the shaft, extending outwardly from the opposite side of the indexing unit 80, are two drive pulleys associated with belts 93 and 94 which in turn drive front and rear cam shafts 96 and 98 respectively. Associated with the cam shafts 96 and 98 are various cams and other drive mechanisms for operating or reciprocating the various cup-forming components located on the top of the table 12. In regard to this drive arrangement it should be particularly noted that the power of the motor 76 is transmitted directly to the indexing unit 80 which drives the first turret 28 (and, as hereinafter described in detail, the second turret 64), and that the remaining power required to drive the other components of the machine radiates outwardly from the indexing unit through the belts 93 and 94, the cam shafts 96 and 98 and the drive mechanisms associated with the cam shafts. This arrangement has been found to provide greatly improved results, particularly in regard to the proper indexing or positioning of the turrets relative to the other components of the machine, than previous drive arrangements wherein the power of the drive motor is in general radiated inwardly from a point near the edge of the machine, and through a number of different components or drive elements, to the turrets.

It should also be noted that associated with the motor 76 is a plugging switch 100 for dynamically bringing the motor to a quick stop.

*Bottom blanking and forming unit and web feeder therefor*

Reference is now made to FIGS. 3 to 8, inclusive, for a detailed description of the bottom blanking and forming unit 14 and of the feed mechanism 24 for intermittently feeding web from the loose loop 22 to the latter unit.

Figure 3:
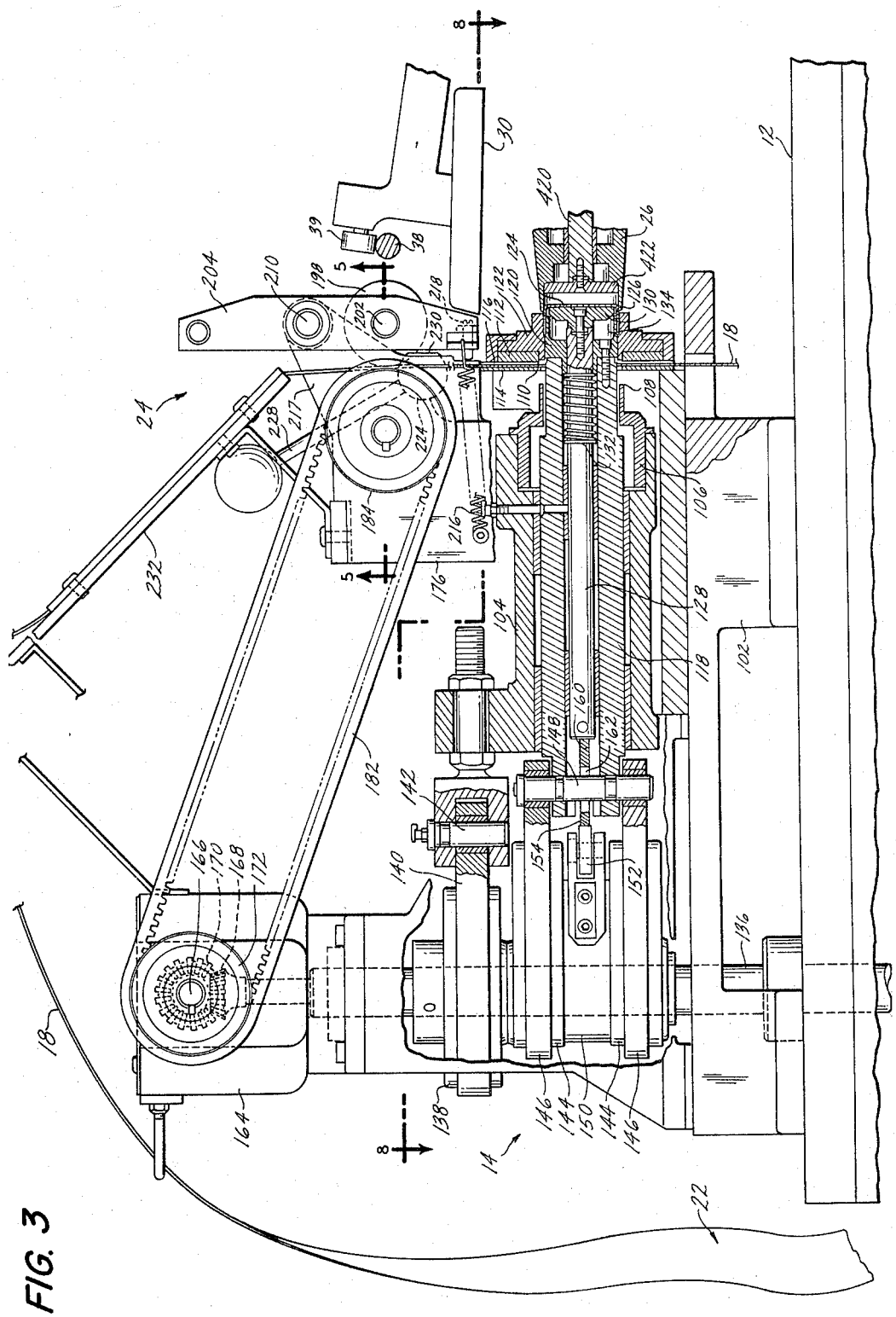
FIG. 3 is a side view partly in elevation and partly in section of the bottom blanking unit of the machine of FIG. 1 and of the web feeder for intermittently feeding a length of web thereto.
Figure 4:
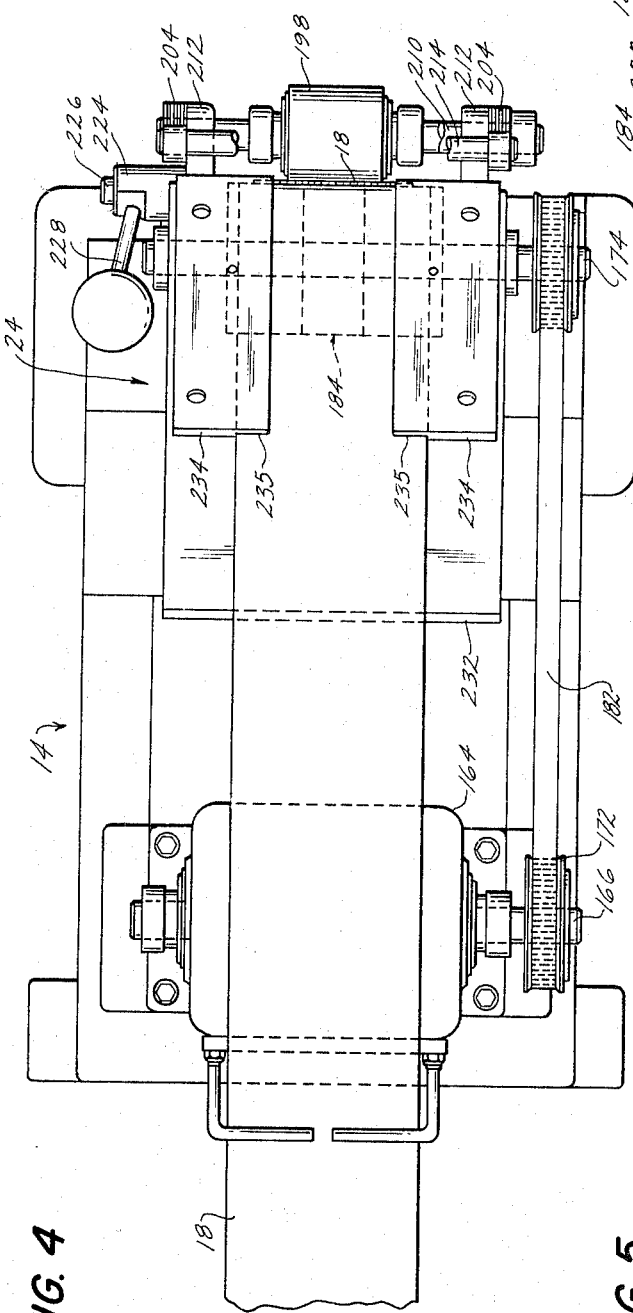
FIG. 4 is a plan view of the web feeder and bottom blanking and forming unit of FIG. 3.

Considering first the bottom blanking and forming unit 14, this unit comprises a base 102 fixed to the table surface 12 and adapted to slidably support a cutter ram 104 for reciprocating motion toward and away from the first turret 28. At its forward end the cutter ram carries an annular cutting die 106 having a forward cutting edge 108 which cooperates with another annular cutting edge 110 on a conforming fixed die 112 located adjacent the front of the base 102. To the left of the fixed cutting die 112, as viewed in FIG. 3, is a guide plate 114 defining a vertically extending slot 116 for guiding the web 18 between the guide plate and the fixed die 112. It will therefore be understood that as the cutter ram 104 moves forwardly or to the right in FIG. 3 the cooperating cutting edges 108 and 110 operate to cut or shear a circular bottom blank from the portion of the web located in the slot 116.

Means are also provided for forming a cylindrical skirt or flange on the cut bottom blank and this means includes a forming ram 118 slidably supported in a longitudinal bore of the cutter ram 104 for movement relative to the latter and along the same axis as the movement of the cutter ram. At its forward end the forming ram 118 has attached thereto a forming die 120 which cooperates with a fixed forming die 122. After the cutting dies perform their operation, the forming ram 118 moves forwardly and presses the movable forming die 120 through the fixed die 122, the movable die at the same time carrying forward the bottom blank illustrated at 124 and causing the periphery of the blank to be bent perpendicular to the main body of the blank to form the desired cylindrical flange or skirt illustrated at 126.

After the cylindrical skirt 126 is formed on the bottom blank 124 the finished blank is moved forwardly from the forming dies into the hollow outer end of the awaiting male mandrel 26. As shown best in FIG. 3, this transferral of the bottom blank to the male mandrel is accomplished by an ejector ram 128 which is slidably received in a longitudinal bore of the forming ram 118 and which carries an annular ejecting head 130 on its outer end. The ejector ram 128 is biased by a spring 132 so that the ejector head is normally held in a retracted position in a cavity 134 formed in the outer end of the forming die 120. During ejection, however, the ejector ram 128 moves forwardly, or to the right in FIG. 3, moving the ejector head 130 out of the cavity 134 and pushing the formed blank 124 into the outer end of the awaiting mandrel 26. In FIG. 3 the various parts of the blanking and forming unit are shown at the positions occupied at a point occurring during the ejection process and before the bottom blank 124 is fully received in the male mandrel 26.

The various parts of the blanking and forming unit are driven by a vertical drive shaft 136 extending upwardly from the table surface 12 at the rear of the unit. During the operation of the machine the drive shaft 136 is continuously rotated by a suitable drive mechanism (not shown) located beneath the table 12 and drivingly connected with the forward cam shaft 96 shown in FIG. 2. The cutting ram 104 is in turn driven from the vertical drive shaft 136 by an eccentric disc or sheave 138 fixed to the shaft 136 and cooperating with an associated connecting part or strap 140 pivotally connected at its forward end to the ram 104 by a pin 142. Movement of the forming ram 118 is effected in a similar manner by two identical eccentric sheaves 144, 144 fixed to the shaft 136 and cooperating with associated connecting or strap members 146, 146 which are pivotally connected at their forward ends to the forming ram 118 by another pin 148.

The two eccentric sheaves 144, 144 are integrally joined with one another and vertically spaced by a sleeve portion 150 to which is attached a roller 152 supported for rotation about a vertical axis fixed relative to the sleeve 150 and spaced some distance from the axis of the shaft 136. As shown best in FIGS. 3 and 8, the roller 152 is engageable with a lever 154 which extends generally transversely of the three rams and at one end is pivotally supported for rotation about a vertical axis by a pin 156 which is carried by a bracket 158 fixed to the forming ram 118. The lever 154 also has a forwardly extending tongue 160 which engages the rear end of the ejector ram 128 and is also provided with an opening 162 for loosely accommodating the pin 148. Throughout the major portion of its travel about the axis of the shaft 136 the roller 152 is out of engagement with the lever 154, and during this time the bias spring 132 urges the ejector ram 128 and the lever 154 rearwardly to retract the ejector head 130 into the cavity 134. As the forming die and ram reach the forward extent of their travel, however, the roller 152 engages the lever 154 and by continued movement of the shaft 136 urges the lever 154 in the counterclockwise direction as viewed in FIG. 8 to move the ejector ram forwardly relative to the forming die to eject the formed bottom blank from the blanking and forming unit. Further rotation of the drive shaft 136 brings the roller 152 out of engagement with the lever 154 so that the ejector ram is returned to its retracted position by the spring 132.

In order that the machine operate satisfactorily and particularly to prevent the formation of leaking cups, it is necessary that the web 18 be fed to the forming and blanking unit 14 in accurately controlled intermittent lengths so that with each operation of the cutting dies a complete circular bottom blank is cut from the web. The present invention provides a web feeder which is driven directly from the drive shaft 136 of the bottom blanking and forming unit so that the web feed is positively synchronized with the operation of the latter unit. This web feeder also includes a means for positively driving the web into the slot 116 and which means is adjustable to allow the length of web fed with each feed operation to be precisely varied. From FIGS. 3 and 4, it will be noted that the drive shaft 136 extends upwardly beyond the upper eccentric 138 and into a gear box 164 which rotatably supports a horizontal output shaft 166 driven by a pair of right angle bevel gears 168 and 170 fixed respectively to the upper end of the shaft 136 and to the output shaft 166, both of said gears being located within the gear box 164. Fixed to one end of the output shaft 166, and located outside of the gear box 164, is a timing belt pulley or sprocket 172.

Figure 5:
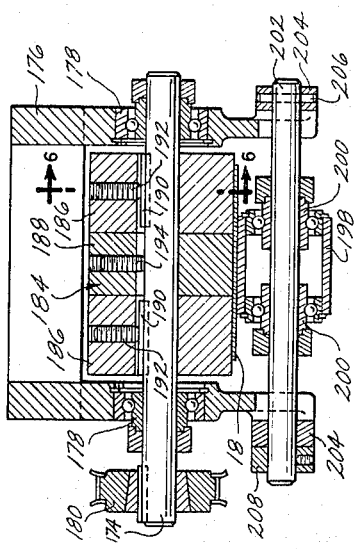
FIG. 5 is a horizontal sectional view taken on the line 5—5 of FIG. 3.
Figure 8:
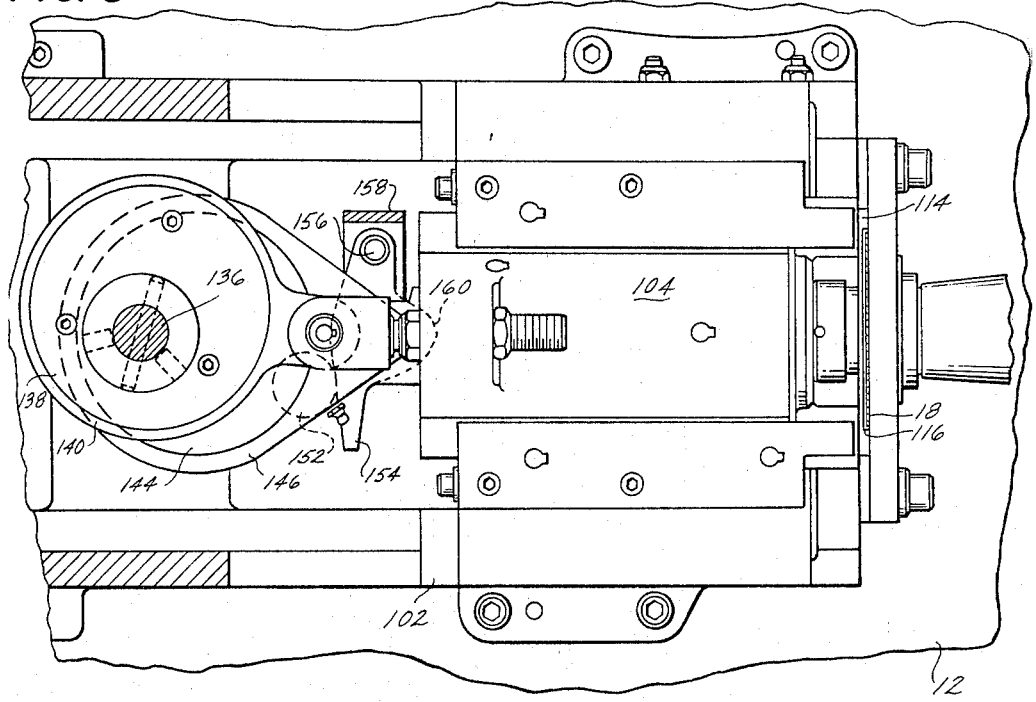
FIG. 8 is a horizontal sectional view taken generally on the line 8—8 of FIG. 3.

At and above the forward end of the forming and blanking unit 14 is a horizontal feeder input shaft 174 which is supported for rotation about its longitudinal axis by a bracket 176 fixed relative to the base 102 for the forming and blanking unit, the shaft 174 being rotatably supported relative to the bracket 176 by two antifriction bearing units 178, 178 as shown in FIG. 5. On one end of the shaft 174 and outboard of the bracket 176 is a timing belt pulley or sprocket 180, and a timing belt 182 which comprises an endless flexible positive drive element is trained about the two sprockets 172 and 180 so that the shaft 174 is positively driven in unison with the shaft 166. Fixed to the feeder input shaft 174 and located between the side walls of the bracket 176 is a feed roll indicated generally at 184, comprised of three axial segments or cylinders 186, 186 and 188. The two end segments 186, 186 are angularly fixed to the shaft 174 by keys 190, 190 and are axially held in place relative to the shaft 174 by associated set screws 192, 192. The middle segment 188 is not keyed to the shaft 174 and is angularly adjustable relative to the two end segments 186, 186 by loosening and tightening its associated set screw 194.

Figure 7:
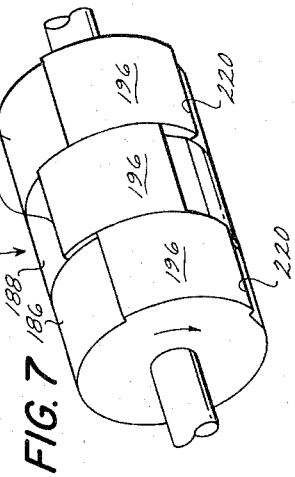
FIG. 7 is an enlarged perspective view of the feed roll employed in the web feeder of FIG. 3.
Figure 6:
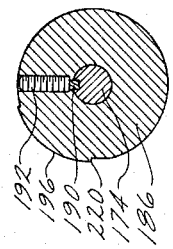
FIG. 6 is a vertical sectional view taken on the line 6—6 of FIG. 5.

As best shown in FIGS. 6 and 7, each axial segment of the feed roll 184 is shaped to define a radially enlarged portion 196 extending circumferential along a portion of the outer surface of the segment. In the illustrated example, each radially enlarged portion 196 extends approximately 75° along the circumference of the associated segment. Along the remaining portion of the circumference the segment has a radius less than that of the enlarged portion 196.

The length of the feed roll 184 and of the axial segments 186, 186 and 188, as shown in FIG. 5, is such that the web 18 extends transversely across the full axial extent of the middle segment 188 and a substantial distance across the axial extent of each of the two end segments 186, 186. Associated with the feed roll 184 is a pressure roll 198 which is supported for rotation about an axis parallel to that of the shaft 174 by two antifriction bearing units 200, 200 carried by a horizontal shaft 202. The latter shaft is supported at opposite ends by two vertical and transversely spaced upright members 204, 204. At one end the shaft 202 is fixed to the associated upright member 204 by a pin 206 and at its other end is restrained against axial movement relative to the bracket 176 by a collar 208. The two uprights 204, 204 are in turn pivotally supported for movement about a horizontal axis by a pivot pin 210 carried by two transversely spaced and upwardly and forwardly extending arms 212, 212 of the bracket 176. The two uprights 204, 204 extend upwardly beyond the pivot pin 210 and at their upper ends are joined by a horizontal connecting shaft 214. The pressure roll 198 is biased toward the feed roll 184 by two tension springs each connected between the bracket 176 and the lower end of an associated one of the upright members 204, 204, one such spring being shown at 216 in FIG. 3.

As shown in FIG. 5, the length of the pressure roll 198 is such that it extends across the middle segment 188 of the feed roll and also across part of the two end segments 186, 186. Also, as shown in FIG. 3, movement of the pressure roll 198 toward the feed roll 184 is limited by an adjustment screw 218 threadably engaged in an ear carried by one of the uprights 204 and engaging at its left-hand end, as viewed in FIG. 3, an abutment surface of the bracket 176. In use the adjustment screw 218 is so adjusted that when the screw is in engagement with the bracket 176 the web 18 will pass freely between the feed roll 184 and the pressure roll 198 when the radially reduced portion of the feed roll is adjacent the pressure roll and will be squeezed between the feed roll and the pressure roll when the radially enlarged portion of the feed roll is adjacent the pressure roll. Therefore, the web is fed downwardly through the rolls as the radially enlarged portion of the feed roll passes the pressure roll and feeding of the web is terminated throughout that portion of the feed roll rotation whereat the radially enlarged portion is out of tangent relationship with the pressure roll. From this it will therefore be obvious that the amount or length of web 18 fed with each revolution of the feed roll 184 may be accurately and precisely varied by adjusting the middle segment 188 angularly relative to the end segments 186, 186, this changing the effective circumferential length of the radially enlarged portion of the feed roll surface. That is, referring to FIG. 7, as the feed roll 184 is rotated in the direction of the arrow, feeding of the web 18 will commence as the leading edges 220, 220 of the radially enlarged surfaces of the two end segments 186 and 186 move into tangent relationship with the pressure roll 198, and feeding will continue until the trailing edge 222 of the radially enlarged portion of the middle segment 188 passes out of tangent relationship with the pressure roll. Adjustment of the middle segment 188 relative to the end segments 186, 186 therefore changes the distance between the leading edges 220, 220 and the trailing edge 222 and accordingly changes the length of the web fed with each feed roll revolution.

In order to permit the intermittent feeding of the web 18 to be temporarily stopped, the feeder 14 also includes a manually operable means for swinging and holding the pressure roll 198 out of feeding relationship with the feed roll 184. In the illustrated instance, this means includes a cylinder cam 224 supported from the bracket 176 for rotation about a horizontal axis by a pivot member 226. Fixed to the actuating cylinder is an operating handle 228. The handle 228 normally gravity biases the cylinder cam 224 to the position illustrated in FIGS. 3 and 4, and, as best shown in FIG. 3, the cylinder cam has a flat face 230 on its outer surface which face is normally out of engagement with the adjacent upright member 204. The handle 228 is, however, manually movable clockwise from the normal position shown in FIG. 3 and when so moved the outer surface of the cylinder will engage the associated upright 204 to swing the two uprights and the pressure roll 198 out of feeding relationship with the feed roll.

The feed roll 184 and the pressure roll 198 are so located that the web 18 passing therethrough is located directly above the slot 116 of the blanking and forming unit. Also, the feeder includes a guide device for guiding the web 18 to the feed and pressure rolls in such a manner that the web passes in a substantially straight line in going from the guide device to the rolls and to the feeder slot. As shown best in FIGS. 3 and 4 this guide device includes an inclined slide plate 232 supported above the feeder and having attached thereto two elongated side pieces 234, 234 which along their inboard edges are provided with longitudinally extending rabbets 235, 235 which together with the upper surface of the inclined plate 232 define transversely spaced slots or grooves for receiving and guiding the two edges of the web 18. The forward edge of the inclined plate 232 is located directly above the nip of the rolls 184 and 198 so that after passing over this edge the web 18 passes in a straight line through the rollers to the slot 116.

*Sidewall blank positioning means*

Figure 11:
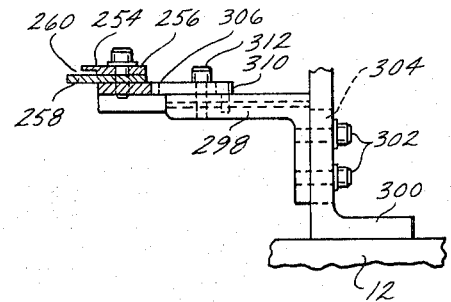
FIG. 11 is a fragmentary sectional view taken on the line 11—11 of FIG. 10.
Figure 9:
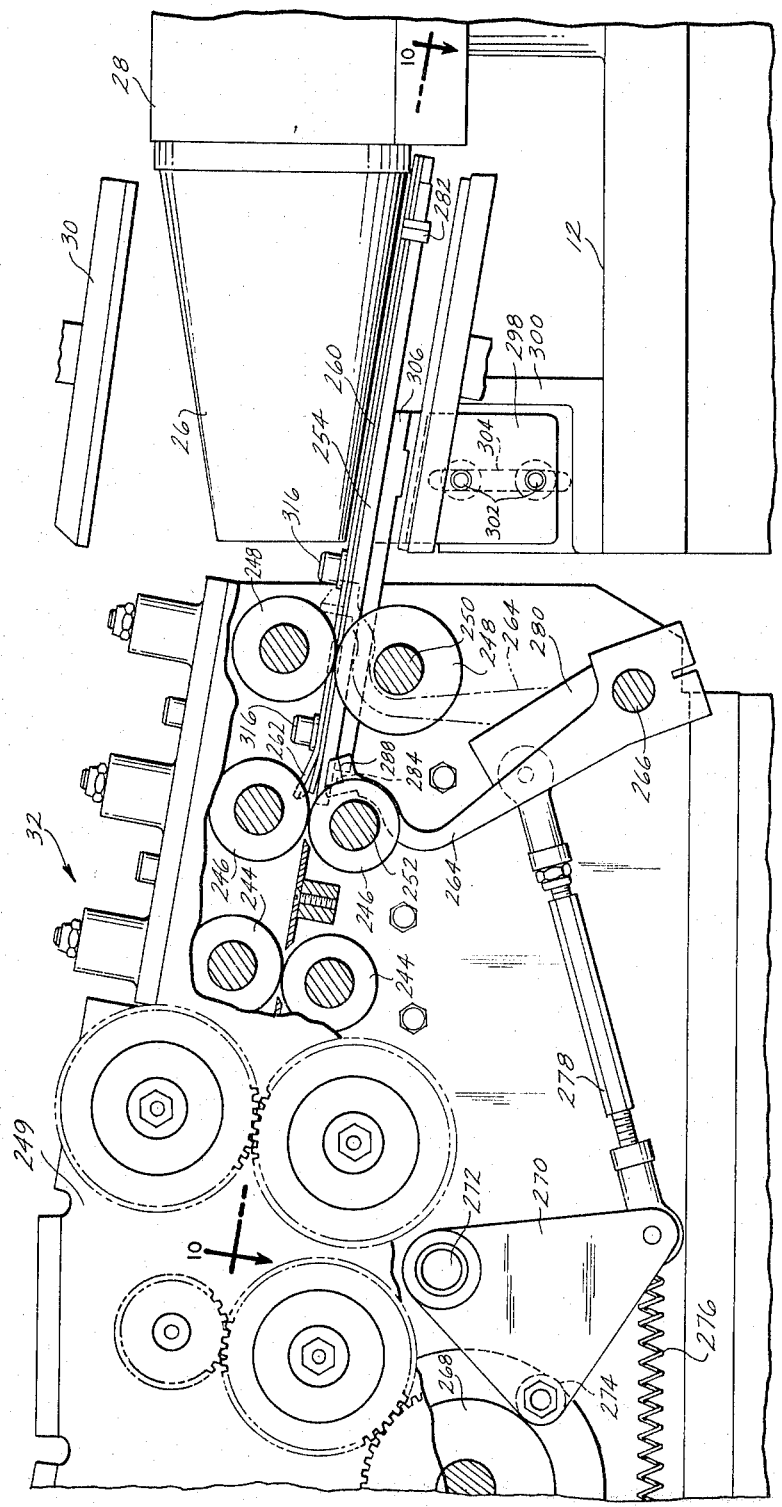
FIG. 9 is a view partly in elevation and partly in vertical section showing the forward end of the feeder for feeding sidewall blanks to the male mandrels and the positioning means for accurately locating the blanks beneath the mandrels prior to the folding operation.
Figure 10:
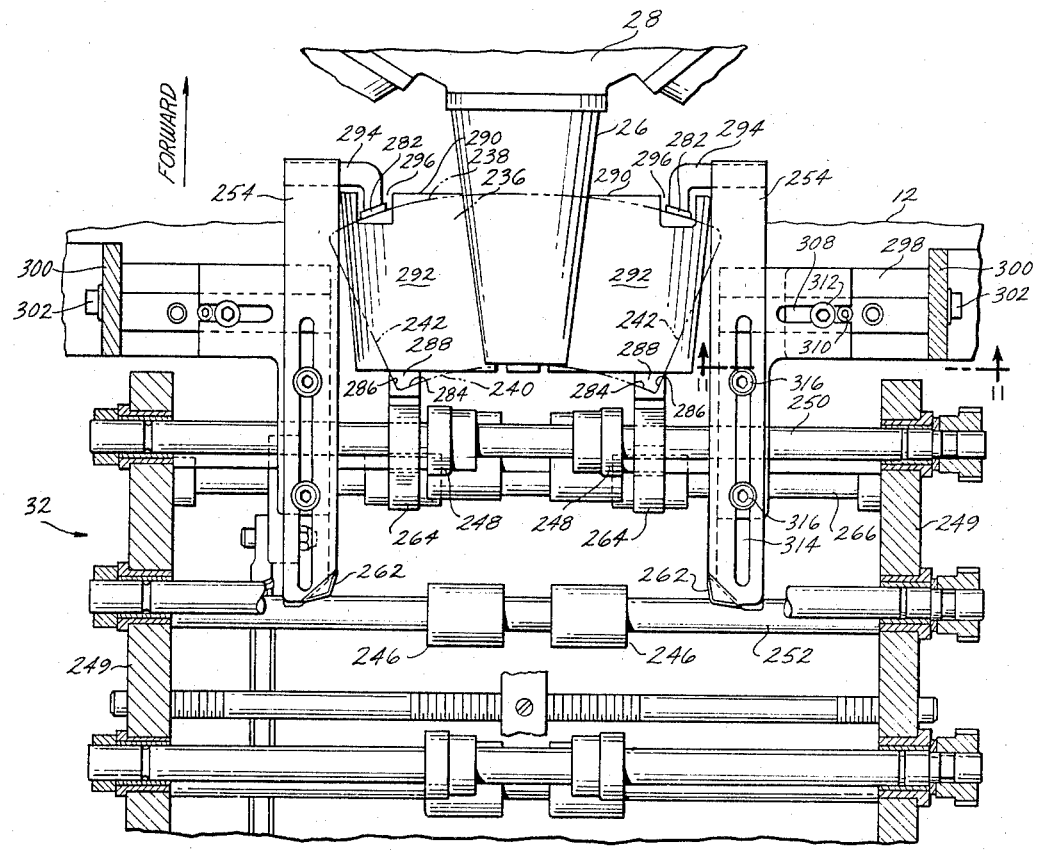
FIG. 10 is a view taken generally on the line 10—10 of FIG. 9 with the positioning fingers being shown in their forward positions corresponding to the broken line illustration of FIG. 9.
Figure 12:
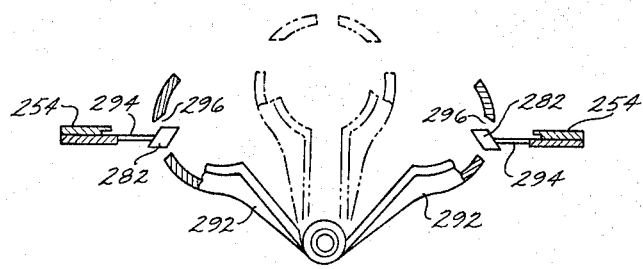
FIG. 12 is a front elevational view of the folding wings showing the same positioned between their raised and lowered positions and with parts of the same broken away to show the manner in which the rear blank stops pass through the notches in the folding wings.

In accordance with the present invention, a novel means is employed for accurately positioning the side wall blanks below the male mandrel 26 prior to the blank being wrapped around the mandrel by the folding wings. Reference is made to FIGS. 9, 10 and 11 for a detailed description of this means.

Considering first FIGS. 9 and 10, these figures show the forward portion of the blank feeder 32 which operates to feed side wall blanks in succession from the stack 34 to the male mandrels in synchronism with the movement of the mandrels past the feeder. The cups made by the present machine are of the type having the shape generally of a truncated cone and the side wall blanks are therefore of generally the developed shape of such a truncated cone. In FIG. 10, one such blank is shown in phantom at 236 and from this it will be noted that the blank has a large convex forward edge 238, a smaller concave rear edge 240 and two nonparallel side walls 242, 242. The blanks are fed to the mandrel 26 with the convex forward edge 238 thereof facing forwardly or toward the turret 28. In FIGS. 9 and 10 and in the following discussion the forward direction is taken to be that direction shown by the arrow in FIG. 10.

As mentioned previously, the feeder 32 is of generally conventional construction and is therefore not shown in detail. For the present purposes, it is sufficient to note that it includes a number of pairs of feed rolls, such as shown at 244, 244, 246, 246 and 248, 248 between which the blanks are passed and which are driven in rotation to move the blanks forwardly by horizontal drive shafts rotatably supported by the side walls 249, 249 of the feeder and driven by intermeshing gears. The lower roll 248 shown in FIG. 9 is fixed to a horizontal shaft 250 and the lower roll 246 of FIG. 9 is fixed to another horizontal shaft 252. From FIG. 10, it will be noted that the shaft 250 actually carries two rolls 248, 248 and that the shaft 252 actually carries two rolls 246, 246.

Extending some distance rearwardly beyond the forward drive shaft 250 are two transversely spaced guide members 254, 254. As shown best in FIG. 11 each guide member 254 comprises two superimposed strips 256 and 258, the upper one of which is rabbeted as shown to provide a longitudinally extending groove or slot 260 opening inwardly toward the corresponding groove 260 in the opposite guide member. These guide members are so arranged relative to the feeder as to receive and have entered in the slots 260, 260 the forward corner portions of a blank 236 as the latter is fed toward the mandrel 26 by the feeder and for this purpose the rear portion of each strip 254 is bent upwardly as shown at 262 to aid in guiding the blank into the grooves. The grooves guide the forward end of the blank as the latter leaves the feeder 32 and associated with the positioning means is a means for advancing the blank forwardly along the guide members 254, 254 after it leaves the forward feed rolls 248, 248.

The last-mentioned means for moving the blank 236 forwardly along the guide members 254, 254 comprises a pair of transversely spaced fingers 264, 264 fixed to a horizontal shaft 266 rotatably supported by the side walls of the feeder. By rotation of the shaft 266 the fingers 264, 264 are movable in unison from a rearward retracted position as shown by the solid lines of FIG. 9 to a forward position as shown by the broken lines of FIG. 9. The shaft 266 is in turn actuated in synchronism with the feeding of the blanks through the feeder by a cam operated mechanism including a cam 268 fixed to a horizontal shaft driven in unison with the feed roll shafts and a link 270 pivotally supported relative to the feeder by a shaft 272 and carrying a follower roll 274, the link being biased to hold the roll in engagement with the cam by a tension spring 276. Also included in the cam operated mechanism is a link 278 pivotally connected at one end to the pivot link 270 and pivotally connected at its other end to an arm 280 fixed to the shaft 266. The timing of the cam 268 is such that as the rear portion of a sidewall blank reaches the forward feed rolls 248, 248 the fingers 264, 264 are moved forwardly to engage the rear corners of the blank and to push the blank forwardly beyond the feed rolls 248, 248 until the fingers reach the forward broken line position of FIG. 9. After the forward broken line position is reached by the fingers 264, 264 the fingers maintain this position for some time and until the bottom clamp, hereinafter described, is operated to clamp the blank to the mandrel.

Cooperating with the positioning fingers 264, 264 are two stops 282, 282, each located at the forward end of a respective one of the guide members 254, 254. From FIG. 10 it will be noted that the stops 282, 282 are so positioned relative to the length of the mandrel 26 that when the positioning fingers 264, 264 reach the forward extent of their movement the forward edge 238 of the blank 236 is brought into engagement with the two stops 282, 282. Also, each finger 264 is formed to define a generally forwardly facing surface 284 which engages the rear edge 240 of the blank, a generally laterally inwardly facing surface 286 which engages the associated side edge 242 of the blank and an upwardly facing surface 288 which engages the undersurface of the blank. Therefore, when the fingers 264, 264 are in their forward positions the blank 236 is accurately positioned relative to the mandrel and prevented in moving in any but the upward direction by the slots 260, 260, the stops 282, 282 and the surfaces 284, 286 and 288 of the positioning fingers 264, 264.

From FIG. 10, it will also be noted that because of the convex shape of the forward edge 238 of the blank, it is necessary that the stops 282, 282 be displaced rearwardly some distance beyond the inboard edges 290, 290 of the folding wings. To permit the use of both the stops 282, 282 and the folding wings 292, 292 the stops 282, 282 are spaced some distance laterally inwardly from the associated guide members 254, 254 by L-shaped arms 294, 294 each of which is attached by suitable means to the forward end of the associated guide member. In addition, each folding wing 292 is provided with a notch 296 extending some distance rearwardly from the edge 290 and through which slot the associated stop 282 passes as the folding wing is moved between its raised and lowered positions, as shown more clearly in FIG. 15.

In order that the guide members may be used with blanks of different sizes for the production of different sized cups, they are preferably supported from the frame of the machine by suitable means permitting their adjustment both longitudinally and transversely and vertically of the mandrel 26. As shown best in FIGS. 9 and 11 this support means in the illustrated case includes for each guide member 254 an L-shaped bracket 298 having a vertical arm fixed to a stationary part 300 of the frame by two screws 302, 302 which pass loosely through an elongated vertical opening 304 in the part 300 and which are threadably engaged with the bracket arm. Carried by a horizontal arm of the L-shaped bracket 298 is an intermediate member 306 having a transverse slot 308 and fastened to the bracket 298 by a guide screw 310 having its head received in the slot 308 and by a larger retaining screw 312. The guide member is in turn provided with a longitudinally extending slot 314 and is fastened to the intermediate member 306 by two screws 316, 316 passing through the slot 314. It will therefore be obvious that by proper loosening and tightening of the screws 316, 316, 312 and 302 the guide members 254, 254 may be shifted in any of three different directions relative to the mandrel 26 to accommodate the blanks of various different sizes. Movement of the guide members longitudinally by means of the slots 314, 314 and screws 316, 316 permits the stops 282, 282 to be adjustably positioned along the length of the mandrel 26.

*Sidewall blank folding mechanism*

Figure 15:
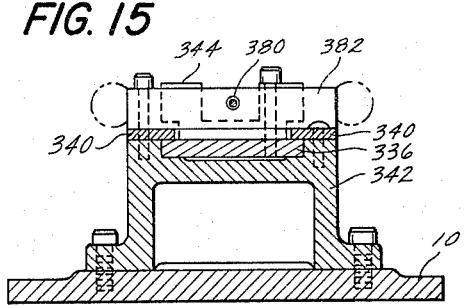
FIG. 15 is a horizontal sectional view taken generally on the line 15—15 of FIG. 13.

The mechanism for folding the sidewall blanks about the male mandrels is shown in detail in FIGS. 13, 14 and 15.

Referring first to FIGS. 13 and 14, the sidewall blanks are folded about the male mandrels by the folding wings 292, 292 which have interior surfaces conforming approximately to the exterior surface of the mandrel. The folding wings are pivotally supported for movement about a common fixed axis located below the position occupied by a mandrel 26 at the folding station and arranged parallel with axis of such a mandrel. In the present instance this pivot axis is provided by a pivot pin 320 supported by a bracket 322 fixed relative to the table 12, the folding wings each having two apertured ears 324, 324 pivotally received on the pin 320. By movement about the axis of the pin 320, the folding wings 292, 292 are movable between a lowered spread position as shown by the broken lines of FIG. 13 to a raised position, as shown by the full lines of FIG. 13, whereat they surround the major portion of the mandrel 26. In moving from the lowered to the raised position, the wings engage the undersurface of a blank 236 positioned beneath the mandrel, remove the blank from the guide members 254, 254 and fold the same about the mandrel 26. After the folding is completed, the folding wings hold the blank to the mandrel until the upper clamp 30 is lowered into engagement with the overlapped side edges. Thereafter the wings are returned to their spread position and the turret indexed to bring a new mandrel to the folding station.

In accordance with the present invention, the pivot pin 320 for the folding wings 292, 292 in addition to being fixed relative to the frame of the machine is additionally adjustable relative thereto to allow the pivot axis to be precisely positioned relative to the axes of the mandrels brought by the turret to the folding station. As shown best in FIG. 14, the illustrated means for permitting adjustment of the pivot pin 320 comprises an L-shaped member 326 having a horizontal leg fastened to the table 12 by two screws, one of which is shown at 328 in FIG. 14, passing through enlarged openings, such as that shown at 330, in the table 12 and threadably received in said horizontal leg. The supporting bracket 322 for the pivot pin 320 is in turn attached to the vertical leg of the L-shaped member 326 by two other screws 332, 332 which pass through oversized openings such as shown at 334 in the bracket 322 and are threadably received in the member 326. It will therefore be obvious that by proper loosening and tightening of the screws 328, 328 and 332, 332, the brackets 322, 322 may be shifted a limited extent in any direction relative to the table 12 to adjust the pivot pin 320 relative to the mandrel axes.

The means for moving the folding wings 292, 292 between their lower and raised positions comprises a vertically movable slide 336 supported for vertical movement relative to the frame of the machine by two transversely spaced vertical guide plates 340, 340 fastened to a slide block 342 having a vertically extending groove 338 therein for receiving the slide. Fixed to the upper end of the slide is an outwardly extending part 344 having attached thereto two eyes 346, 346. Cooperating with these eyes are two actuating rods 348, 348 which are respectively pivotally connected to the two folding wings 292, 292 at their upper ends, as shown at 350, 350, with the lower end portions of the actuating rods 348, 348 being slidably received by the eyes 346, 346. Received on each actuating rod is a helical compression spring 352 which extends along the length of the rod between the associated eye 346 and a nut 354 which is carried by the upper end of the rod and which forms a seat for the upper end of the spring 352. In FIG. 13, the full lines show the actuating rods 348, 348 in the positions occupied when the slide 336 is in its upper position and the broken lines indicate the positions occupied by the rods when the slide is in its lower position. When the slide is moved from its lower to its upper position, the upward movement of the eyes 346, 346 is imparted to the folding wings 292, 292 through the springs 352, 352. Below each eye 346 the associated actuating rod 348 threadably received two nuts 356, 356. By shifting the nuts 356, 356 relative to the actuating rods 348, 348 one folding wing may be made to close on the mandrel 26 before the other.

The slide 336 is driven in synchronism with the indexing movement of the turret 28 by a cam 358 fixed to the forward cam shaft 96. An arm 360 is pivotally connected with the frame at 362 and carries a follower 364 received in a cam groove in the cam 358 so as to be raised between the raised and lowered positions shown in FIG. 14. At its free end the arm 360 is pivotally connected with the slide 336 by a link 366 pivotally connected at its lower end with the arm 360 and pivotally connected at its upper end with a part 368 fixed to the slide.

The folding mechanism also includes a bottom clamp for clamping the sidewall blank to the male mandrel during the upward or folding movement of the folding wings 292, 292. Such a bottom clamp is shown at 370 in FIGS. 13 and 14, and in accordance with the present invention it is movable vertically toward and away from the mandrel 26 independently of the folding wings 292, 292. The means for so supporting the clamp 370 includes a depending stem 372, which is integral with the clamp, having at its upper end a vertically elongated opening 374 which receives the pivot pin 320 for the folding wings 292, 292. At its lower end the stem 372 carries a rotatable roll 376 which is received between two laterally spaced vertical walls 378, 378 of the bracket 322. The sidewalls of the slot 374 are spaced apart by a distance substantially equal to the diameter of the pin 320 and the sidewalls 378, 378 are likewise spaced apart by a distance approximately equal to the diameter of the roll 376. Therefore the roll 376 and the pin 320 guide the stem 372 and the clamp 370 for straight line vertical movement relative to the mandrel 26.

The bottom clamp 370 is spring biased toward the mandrel 26 and is moved away from the mandrel and against the bias of the spring only when the slide 336 is in or near its lower position corresponding to the spread position of the folding wings. The means for so biasing and moving the bottom clamp 370 in the illustrated case comprises a depending actuating rod 380 pivotally connected at its upper end to the depending stem 372 and passing downwardly from the stem 372 through a vertical opening in a crosspiece 382, fixed to the slide block 342, and through another vertical opening in the part 368 carried by the slide. Received on the actuating rod between the crosspiece 382 and a nut 384 threadably received on the upper end of the rod is a helical compression spring 386. The spring 386 is compressed between the nut 384 and the crosspiece 382 and normally urges the bottom clamp 370 upwardly against the mandrel 26 or a blank positioned on the mandrel. At its lower end the actuating rod 380 carries a stop member 388 which is threadably received thereon so as to be adjustable vertically thereof. The stop 388 is so positioned on the rod 380 so as to be engaged by the part 368 when the slide is in its lower position, the downwardly facing surface of the part 368 forming an abutment surface for engaging the stop 388. That is, when the slide is in its lower position the part 368 holds the stop member 388 slightly below the position shown in FIG. 14 and therefore holds the clamp 370 some distance away from the mandrel 26 against the bias of the spring 386. As soon as the slide moves upwardly from its lower position the rod 380 is similarly moved upwardly by the spring 386 so that the bottom clamp is moved toward the mandrel 26 to clamp the sidewall blank thereto as soon as the folding wings 292, 292 start their closing movement and before they engage the blank.

*Indexing drive for turrets*

In previous cup making machines of the type employing two turrets the indexing of the turrets has generally been accomplished by employing a separate indexing unit for each turret or a single indexing unit having two output shafts each connected with a respective one of the turrets. This type of arrangement has made it difficult to obtain and maintain a precise positional relationship between the two turrets and the other components of the machine during the dwell periods. If one of the turrets is adjusted to index properly relative to the cup-forming components associated therewith, the other turret, due to lack of precise synchronism between the two separate indexing units or to looseness or the like in the drive train between the two output indexing shafts, will often be indexed slightly short or beyond the desired position thereby causing possible malfunctioning between it and the first turret or between it and the various cup-forming components associated therewith.

In accordance with one aspect of the present invention a novel turret drive means is provided whereby this inaccuracy in the indexing of the two turrets is avoided. Basically, this drive arrangement comprises a single indexing unit for driving one of the turrets, a drive means between the driven turret and the other turret for roughly indexing the other turret in response to the indexing movement of the first turret, and a locating or lock device engageable with positioning notches or the like on the other turret for precisely positioning the latter turret during each dwell period.

Figure 16:
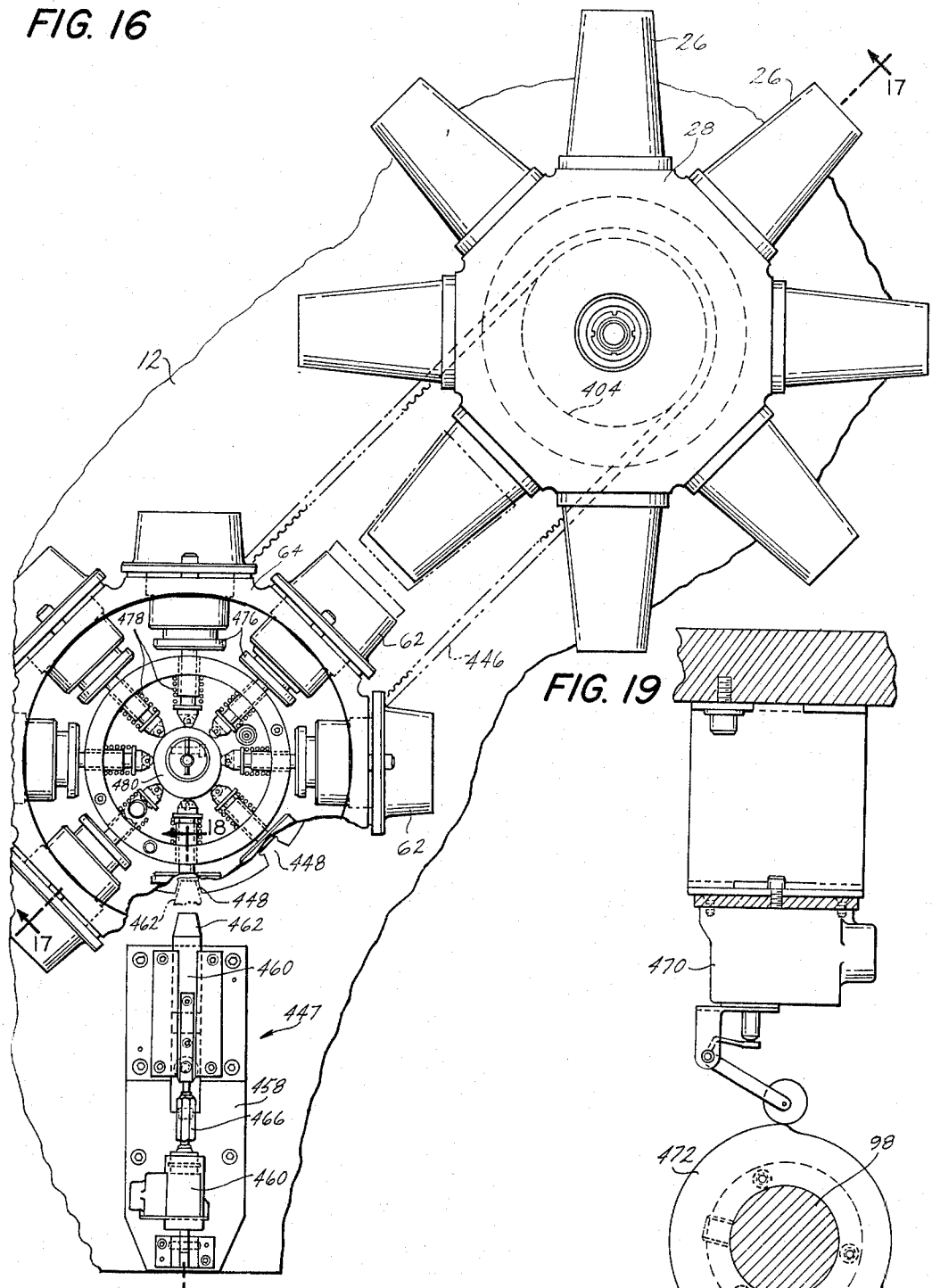
FIG. 16 is a plan view of the two turrets with part of one turret being shown broken away to show more clearly the structure of other parts.
Figure 19:
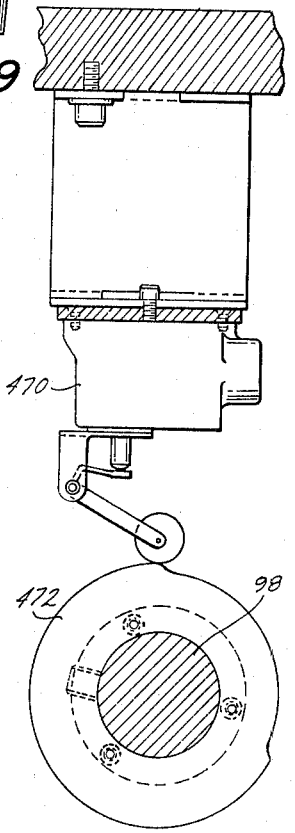
FIG. 19 is an elevational view of one of the switches employed for controlling the operation of the air operated locator device of FIG. 18.
Figure 17:
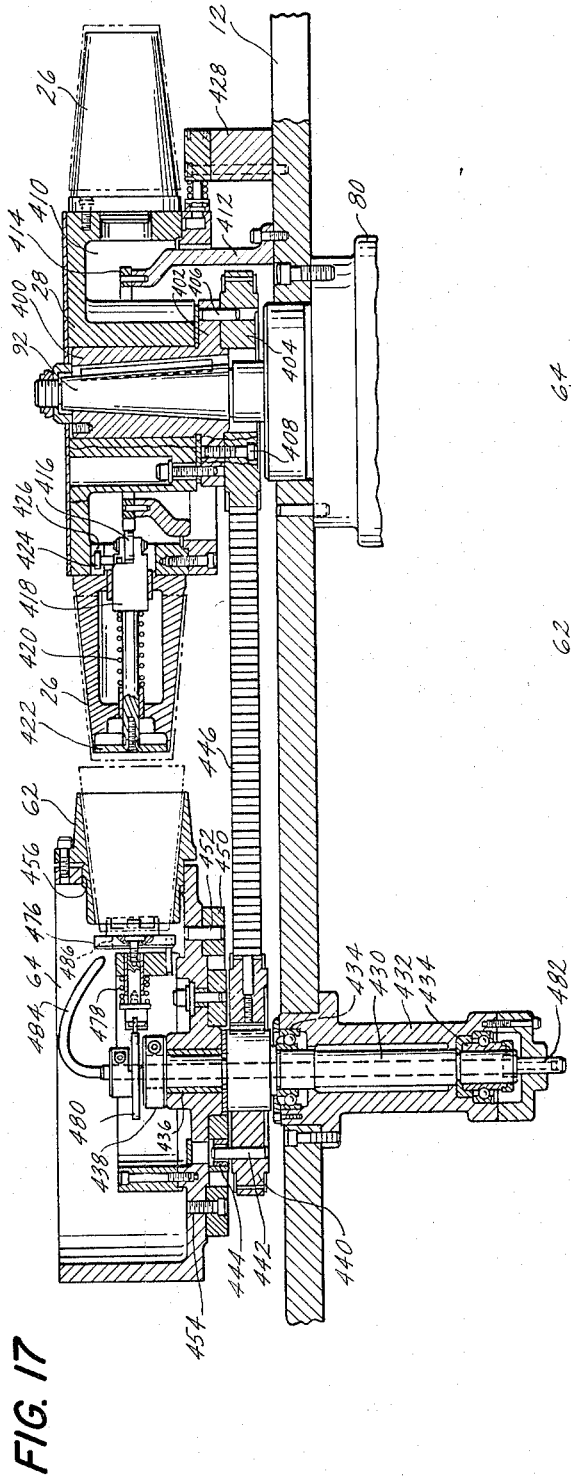
FIG. 17 is a vertical sectional view taken generally on the line 17—17 of FIG. 16.

The present embodiment of the drive means is shown in detail in FIGS. 16, 17, 18 and 19. Referring first to FIGS. 16 and 17, and as mentioned previously in connection with FIGS. 1 and 2, the first turret 28 carrying the male mandrels 26, 26 is driven by an indexing unit 80 having a vertical output shaft 92 which is driven in an indexing manner in response to continuous rotation of the input shaft 90 shown in FIG. 2. The output shaft 92 is tapered and has keyed thereto an adaptor 400 which is fixed to the turret 28. At its lower end the adaptor 400 includes a radial flange 402 which is attached to a positive drive element in the form of a timing belt sprocket 404, the sprocket being coaxial with the index drive shaft 92 and fixed to the flange 402 by a locating dowel 406 and a plurality of screws such as shown at 408. The turret 28 has a hollow annular cavity 410 which opens at the bottom, and positioned in this cavity and fixed to the table surface 12 by standards such as shown at 412 is an annular cam track 414 engaged by a plurality of follower rolls, such as shown at 416, each of which is associated with a respective one of the male mandrels 26 and is fixed to a plunger 418 supported for reciprocating radial movement relative to the turret and biased toward the cam track 414 by a helical compression spring 420. At its forward or outboard end each plunger 418 carries a head 422 which serves to position the bottom blanks relative to the mandrel and to aid in ejecting the partially formed cups from the mandrel at the transfer station. On its inboard end the plunger 420 also carries a guide roll 424 which is supported for rotation about a vertical axis and which is received between two radially extending spaced walls one of which is shown at 426. The engagement of the roll 424 with the two walls 426, 426 prevents rotation of the plunger about its longitudinal axis.

Also associated with the first turret 28 is a fixed vacuum head 428 which is connected with a source of vacuum and with openings in the turret, which openings are successively brought into alignment with the vacuum head as the turret indexes and which communicate with channels in the male mandrels 26 for applying a vacuum assist to aid in folding and holding the sidewall blanks and bottom blanks to the male mandrel as is well known in the prior art. Also included, but not shown, is a head similar to the head 428 for supplying compressed air to the turret 28 for ejecting partially formed cups at the transfer station.

The second turret 64 is supported for rotation about an axis spaced from a parallel with the axis of the index drive shaft 92 by a hollow shaft 430 which in turn is supported from the table 12 by a support housing 432 and two antifriction bearing units 434, 434. The turret 64 is not angularly fixed to the shaft 430 but is supported for rotation relative thereto by a plain bearing or bushing 436. A collar 438 fixed to the shaft 430 retains the turret 64 in place on the shaft. Below the turret the shaft 430 has fixed thereto another positive drive element in the form of a timing belt sprocket 440 coaxial with the turret. The sprocket 440 constitutes a drive member for the turret 64 and between it and the turret is a drive means for imparting the rotation of the sprocket to the turret while nevertheless permitting the turret to move a small limited amount angularly relative to the sprocket. This drive means in the present case comprises a drive pin 442 fixed to the sprocket 440 and extending upwardly therefrom into a bushing 444 carried by the turret and having an inside diameter slightly larger than the outside diameter of the drive pin. Therefore, the clearance between the drive pin and the bushing 444 permits limited angular movement between the turret and the sprocket. The amount of the limited relative movement is considerably smaller than the indexing movement accomplished during each indexing movement of the two turrets.

The drive sprocket 404 of the first turret is drivingly connected with the sprocket 440 of the second turret by a timing belt 446 which comprises a flexible endless positive drive element. It will therefore be obvious that each time the first turret 28 is indexed by the indexing movement of the shaft 92 the second turret 64 is also roughly indexed in unison therewith by motion imparted thereto through the drive train comprising two sprockets 404, 440, the timing belt 446 and the drive pin 442.

Also associated with the second turret 64 is a locating device 447 fixed relative to the frame of the machine and having a movable part movable into engagement with a positioning means on the turret for accurately positioning the second turret about its axis after being roughly indexed to such position by the timing belt 446. Considering first the positioning means on the second turret 64, these means include a plurality of wedge-shaped notches arranged circumaxially of the second turret, there being one such notch associated with each of the cup receivers 62, 62 carried by the turret. Two such notches are shown at 448, 448 in FIG. 16, these notches being formed in an annular member 450 fixed to the second turret 64 by a locating dowel 452 and a plurality of screws such as the one shown at 454. The notches 448 are very accurately located relative to the center line of the cup receivers 62, 62 and preferably the sockets 456, 456 in the turret 64 which receive the cup receivers are not machined until the annular ring 450, with the notches 448, 448 already formed therein, is attached to the turret. The notches 448, 448 may then be used for locating the turret during the machining of the sockets 456, 456 to assure an accurate relationship between such sockets and the notches.

Figure 18:
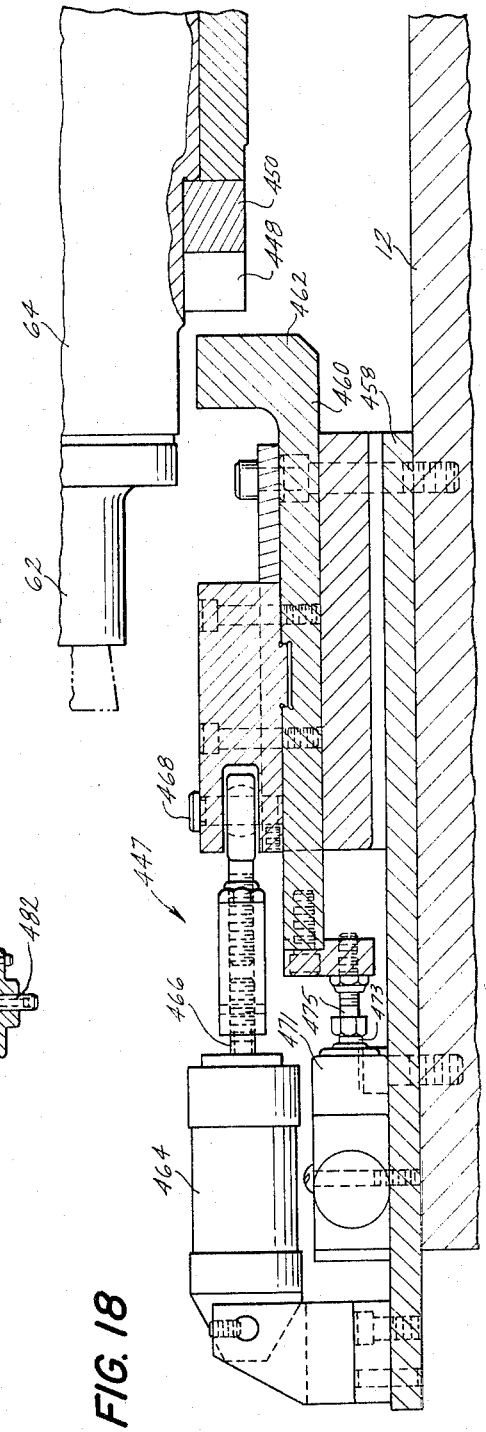
FIG. 18 is an enlarged vertical sectional view through the air operated locator device associated with the second turret, the view being taken generally on the line 18—18 of FIG. 16.

The locating device for the second turret is shown best in FIG. 18 and comprises a base 458 fixed to the table 12 and a movable part 460 suitably supported for sliding movement relative to the base 458 and radially of the second turret 64. At its forward end the movable part 460 includes a head 462 having mutually inclined vertical walls conforming to the inclined sidewalls of the notches 448, 448. The part is movable toward and away from the turret 64 and when moved forwardly it is adapted to enter an aligned notch 448 as shown by the broken lines of FIG. 16. In entering the notch 448 the head 462 engages the sidewalls of the notch and, if necessary, moves the turret relative to the table 12 and relative to the sprocket 440, as permitted by the clearance between the drive pin 442 and the bushing 444, to bring the turret into its desired angular position relative to the other parts of the machine.

Movement of the movable part 460 toward and away from the second turret is effected by a double-acting air motor 464 having an output rod 466 pivotally connected with the movable part 460 by a pivot pin 468. The motor 464 is operated in synchronism with the indexing movement of the first turret 28 and in such a manner as to move the part 460 forwardly toward the second turret 64 at the beginning of each dwell period of the first turret and to withdraw the part 460 from the second turret at or slightly before the end of the dwell period of the first turret. The means for so operating the motor 464 may take various different form but in the present case the motor is operated by solenoid actuated valves, which may be of conventional construction and are not shown, operated by an electrical switch such as shown at 470 in FIG. 19. The switch 470 is operated by a cam 472 fixed to the rear cam shaft 98 of the machine. During each indexing cycle the shaft 98 completes one full revolution and as the cam 472 rotates with the shaft the switch is opened and closed at the proper time for operating the solenoid valves in synchronism with the first turret.

The locator device 447 shown in FIG. 18 also includes an interlock switch for stopping the operation of the machine in the event the movable part 460 in not withdrawn at the proper time before the start of the next following index period. This switch is shown at 471 in FIG. 18 and includes an actuating plunger 473 which is engaged and operated by an arm 475 on the movable part 460 when the latter part is in its withdrawn position. In cooperation with the switch 471 is another cam operated switch, similar to that shown in FIG. 19, and associated circuitry for actuating the plugging switch 100 to bring the motor 76 to a dynamic stop if the plunger 473 of the switch 471 is not actuated at the proper time in comparison to the operation of the associated cam operated switch.

Referring again to FIGS. 16 and 17, it should be noted that the turret 64 also includes means for ejecting the finished cups from the cup receivers 62, 62 at the discharge station. This means includes a plurality of plungers 476, 476, one associated with each cup receiver 62, supported by the turret for radial reciprocating movement and biased inwardly toward the center of the turret by associated springs 478, 478. At their inner ends, each plunger includes a follower roll which bears against a stationary cam 480 fixed to a stationary hollow rod 482 extending upwardly through the bore of the shaft 430. The cam 480 is so shaped that as a cup receiver nears the discharge station, which station coincides with that of the locator device 447, the associated plunger 476 is moved radially outwardly by the cam to dislodge the finished cup from the receiver. After the cup is so dislodged a blast of compressed air is delivered to the inner end of the cup by a nozzle 484 to blow the cup into the discharge tube 74. The nozzle 484 is connected to and supplied with air from the bore of the hollow rod 484, the latter also serving as a delivery conduit for the air. The nozzle 484 is aimed to direct its jet of air through an opening 486 in the head of the plunger.

The invention claimed is:

1. In a paper cup making machine the combination comprising a frame, first and second turrets supported for rotation relative to said frame about spaced first and second axes respectively, an indexing drive unit carried by said frame and having an output shaft directly connected with said first turret for moving the latter in an indexing manner about said first axis, drive means between said indexing drive unit output shaft and said second turret for driving said second turret in response to movement of said output shaft and which drive means permits said second turret to move a limited extent relative to and independently of said output shaft so that said second turret is roughly indexed about said second axis as a result of each indexing movement of said output shaft, the extent of said independent relative movement of said second turret being small in comparison to the total angular movement of said output shaft accomplished during each indexing period, a plurality of circumaxially spaced locating means fixed relative to said second turret, and a locating device connected with said frame and having a part movable into engagement with one of said locating means on said second turret during each dwell period of said first turret, said locating means and said movable part of said locating device being so constructed and arranged as to move said second turret about said second axis if necessary to bring the same closer to a predetermined and desired index position relative to said frame and first turret.

2. In a paper cup making machine the combination comprising a frame, first and second turrets supported for indexing movement relative to said frame about spaced axes, an indexing drive unit carried by said frame and having an output shaft directly connected with said first turret for moving the latter in an indexing manner about its axis, a rotatable drive member associated with said second turret, drive means between said drive member and said second turret for imparting the rotation of said drive member to said second turret and which drive means is so constructed as to allow said second turret to move angularly a limited extent in either direction about its axis independently of said drive member with the total extent of said independent angular movement being small in comparison to the desired angular movement of said second turret accomplished during each of its indexing periods, means for moving said drive member in unison with the movement of said output shaft so that said second turret is moved and roughly indexed about its axis as a result of each indexing movement of said first turret, a plurality of circumaxially spaced locating means fixed relative to said second turret, and a locating device connected with said frame and having a part movable into engagement with one of said locating means on said second turret during at least a portion of each dwell period of said first turret, said locating means and said movable part of said locating device being so constructed and arranged as to move said second turret relative to said drive member, if necessary, to bring said second turret closer to a predetermined and desired index position relative to said frame and first turret.

3. The combination defined in claim 2 further characterized by said drive member being coaxial with said second turret.

4. The combination defined in claim 3 further characterized by said drive means between said drive member and said second turret comprising a drive pin fixed to one of said latter two parts and received in an opening in the other of said parts, said opening being of a size substantially larger than said pin so as to loosely accommodate the latter.

5. The combination defined in claim 2 further characterized by said locating means comprising wedge-shaped notches in said second turret, and said movable part of said locator device comprising a plunger having a conforming wedge-shaped portion adapted to enter and engage the walls of an adjacent one of said notches to accurately locate said second turret relative to said locator device.

6. In a paper cup making machine the combination comprising a frame, first and second turrets supported for indexing movement relative to said frame about spaced axes, a drive means connected with said first turret for moving the latter in an indexing manner about its axis, a rotatable drive member, drive means between said drive member and said second turret for imparting the rotation of said drive member to said second turret and which drive means is so constructed as to allow said second turret to move angularly a limited extent in either direction about its axis independently of said drive member with the total extent of said independent angular movement being small in comparison to the desired angular movement of said second turret accomplished during each of its indexing periods, means for moving said drive member in unison with the movement of said first turret so that said second turret is moved and roughly indexed about its axis as a result of each indexing movement of said first turret, a plurality of circumaxially spaced locating means fixed relative to said second turret, and a locating device connected with said frame and having a part movable into engagement with one of said locating means on said second turret during at least a portion of each dwell period of said first turret, said locating means and said movable part of said locating device being so constructed and arranged as to move said second turret relative to said drive member, if necessary, to bring said second turret closer to a predetermined and desired index position relative to said frame and first turret, said spaced axes of said two turrets being vertical, one of said turrets having attached thereto a plurality of male mandrels arranged with their axes horizontal, and the other of said turrets having attached thereto a plurality of cup receivers having their axes also arranged horizontal, the axes of said male mandrels and the axes of said cup receivers being all located in a common horizontal plane.

7. In a paper cup making machine the combination comprising a frame, first and second turrets supported for indexing movement relative to said frame about spaced axes, an indexing drive unit carried by said frame and having an output shaft directly connected with said first turret for moving the latter in an indexing manner about its axis, a rotatable drive member associated with said second turret, drive means between said drive member and said second turret for imparting the rotation of said drive member to said second turret and which drive means is so constructed as to allow said second turret to move angularly a limited extent in either direction about its axis independently of said drive member with the total extent of said independent angular movement being small in comparison to the desired angular movement of said second turret accomplished during each of its indexing periods, drive means between said indexing drive unit output shaft and said drive member for moving said drive member in unison with the movement of said output shaft so that said second turret is moved and roughly indexed about its axis as a result of each indexing movement of said output shaft, a plurality of circumaxially spaced locating means fixed relative to said second turret, a locating device connected with said frame and having a part movable toward and away from said second turret, said locating means being so arranged on said second turret that after a rough indexing movement of said second turret a respective one of said locating means is roughly aligned with said movable part and said locating means and said movable part being so constructed and arranged that movement of said movable part toward a locating means roughly aligned therewith brings said part into engagement with said locating means and if necessary moves said second turret relative to said drive member to bring said second turret closer to a predetermined and desired index position relative to said frame and first turret, and means synchronized with the movement of said first turret for moving said movable part toward said second turret at the end of each indexing movement of said output shaft and for withdrawing said movable part from said second turret before the beginning of the next following indexing movement of said output shaft.

8. The combination defined in claim 7 further characterized by a drive motor, said indexing drive unit having a continuously rotatable input shaft drivingly connected with said motor, cam means rotated continuously in unison with said input shaft, a pressure fluid motor for moving said movable part of said locator device, and means operated by said cam means for controlling the operation of said pressure fluid motor.

9. The combination as defined in claim 8 further characterized by a plugging switch for said drive motor, and means including a switch operated by said movable part of said locator device for actuating said plugging switch to stop said drive motor in the event said movable part is not withdrawn from said second turret a short time before the intended beginning of the next following movement of said output shaft.

10. In a paper cup making machine the combination comprising a frame, first and second turrets supported for rotation relative to said frame about spaced first and second axes respectively, an indexing drive unit carried by said frame and having an output drive shaft directly connected with said first turret for moving the latter in an indexing manner about said first axis, first and second sprockets coaxial with said first and second axes respectively, means angularly fixing one of said sprockets to its associated turret, drive means between the other of said sprockets and its associated turret permitting a limited amount of relative angular movement therebetween which amount of relative angular movement is small in comparison to the angular movement of said first turret accomplished during each indexing period, an endless flexible positive drive element trained about said two sprockets so that said second turret is moved and roughly indexed about its axis as a result of each indexing movement of said first turret, a plurality of circumaxially spaced locating means fixed relative to said second turret, and a locating device connected with said frame and having a part movable into engagement with one of said locating means on said second turret during each dwell period of said first turret, said locating means and said movable part of said locating device being so constructed and arranged as to move said second turret about its axis if necessary to bring the same closer to a predetermined and desired index position relative to said frame and first turret.

11. In a cup making machine of the type for making paper cups having generally the shape of a truncated cone and utilizing flat side wall blanks having generally the developed shape of a truncated cone so as to include a large convex forward edge and a smaller concave rear edge joined by two nonparallel side edges, the combination comprising a frame, a turret carrying a plurality of frustoconical mandrels and supported for indexing movement relative to said frame about a given axis to bring said mandrels in succession to a work station fixed relative to said frame, two transversely spaced guide members fixed relative to said frame and disposed so as to extend along the length and generally below a mandrel positioned at said work station, said guide members each having a longitudinally extending groove opening inwardly toward the other groove for receiving and guiding a respective forward corner portion of a side wall blank, a feeder adjacent said work station for feeding sidewall blanks in succession toward and longitudinally of a mandrel at said work station and into said grooves of said guide members as it leaves said feeder, two stops located one at the forward end of each guide member for engaging and positioning the forward edge of a blank moved forwardly along said guide members, and two transversely spaced positioning fingers pivotally movable about a horizontal axis between rearward and forward positions and adapted when moved forwardly to engage the rear corners of a blank as it leaves said feeder and to push the same forwardly along said guide members until the forward edge of the blank engages said stops and to thereafter hold the blank in said position, said positioning fingers each having a forwardly facing surface engageable with the rear edge of the blank, a laterally inwardly facing surface engageable with the associated side edge of the blank and an upwardly facing surface engageable with the underside of the blank so that the blank is held and precisely positioned beneath said mandrel by said stops, said guide members and said finger surfaces when said fingers are in their forward positions.

12. The combination defined in claim 11 further characterized by a pair of folding wings supported for pivotal movement about an axis located below and generally parallel to the axis of a mandrel positioned at said work station, said folding wings being movable between a lowered spread position whereat the same are disposed below a sidewall blank positioned as aforesaid below said mandrel and a raised closed position, said folding wings being of such shape as to surround the major portion of said mandrel when in their closed position and serving when moving from their spread to their raised position to wrap said sidewall blank around said mandrel, said two stops each being spaced some distance laterally inwardly from its associated guide, and each of said folding wings having a slot in its inboard end through which slot the associated one of said stops passes as the wing moves between its spread and closed position.

13. In a cup making machine of the type for making paper cups having generally the shape of a truncated cone and utilizing flat sidewall blanks having generally the developed shape of a truncated cone so as to include a large convex forward edge and a smaller concave rear edge joined by two nonparallel side edges, the combination comprising a frame, a turret carrying a plurality of frusto-conical mandrels and supported for indexing movement relative to said frame about a given axis to bring said mandrels in succession to a work station fixed relative to said frame, two transversely spaced guide members fixed relative to said frame and disposed so as to extend along the length and generally below a mandrel positioned at said work station, said guide members each having a longitudinally extending groove for receiving and guiding a respective forward corner portion of a sidewall blank, a feeder adjacent said work station for feeding sidewall blanks in succession toward and longitudinally of a mandrel at said work station and into said grooves of said guide members as it leaves said feeder, two stops located one at the forward end of each guide member for engaging and positioning the forward edge of a blank moved forwardly along said guide members, each of said stops being spaced laterally inwardly of its associated guide member, means for moving a blank forwardly along said guide members after it leaves said feeder until the forward edge of the blank engages said stops and for thereafter holding the blank in said position, and a pair of folding wings supported for pivotal movement about an axis located below and generally parallel to the axis of a mandrel positioned at said work station, said folding wings being movable between a lowered spread position whereat the same are disposed below a sidewall blank positioned as aforesaid below said mandrel and a raised closed position, said folding wings being of such shape as to surround the major portion of said mandrel when in their closed position and serving when moving from their spread to their raised position to wrap said sidewall blank around said mandrel, said two stops each being spaced some distance laterally inwardly from its associated guide, and each of said folding wings having a slot in its inboard end through which slot the associated one of said stops passes as the wing moves between its spread and closed position.

14. The combination defined in claim 13 further characterized by support means for said guide members including means permitting adjustment of each guide member both laterally and vertically relative to said frame.

15. The combination defined in claim 14 further characterized by each of said stops being fixed to the associated guide member and said support means for said guide members further including means permitting longitudinal adjustment of each of said guide members to adjust said stops relative to the length of said mandrel.

16. In a cup making machine the combination comprising a frame, a turret carrying a plurality of mandrels and supported for indexing movement relative to said frame about a given axis to bring said mandrels in succession to a work station fixed relative to said frame, a pair of folding wings at said work station supported for pivotal movement about a common axis fixed relative to said frame and located below and parallel with the axis of a mandrel positioned at said work station, said folding wings being movable between a lowered spread position to a raised closed position relative to said mandrel, said folding wings further being adapted to engage a sidewall blank initially positioned beneath said mandrel and to fold said blank around said mandrel during movement from said spread to said closed position and said folding wings being so shaped as to surround the major portion of said mandrel and to hold the folded blank thereon when in their closed position, means for moving said folding wings between said lowered and raised positions in synchronism with the indexing movement of said turret, and means for adjusting said fixed pivot axis relative to said frame so as to allow said pivot axis to be initially accurately set to a desired relationship relative to the axis of a mandrel positioned at said work station.

17. The combination defined in claim 16 further characterized by said means for moving said folding wings comprising a slide located below said pivot axis and vertically movable relative to said frame between upper and lower positions, two eyes fixed to said slide, two generally vertical actuating rods each pivotally connected at its upper end to a respective one of said folding wings and having a lower portion slidably received in a respective one of said eyes, each of said rods also including means providing a spring seat near the upper end thereof, two helical compression springs each received on a respective one of said actuating rods between its spring seat and the associated eye whereby upward movement of said slide is transferred by said eyes through said springs to said actuating rods, a bottom clamp located below a mandrel positioned at said work station and movable vertically toward and away from said mandrel independently of said folding wings, spring biasing means for urging said clamp toward said mandrel and into clamping relationship with said mandrel and a sidewall blank positioned between said clamp and said mandrel, and coengaging means between said slide and said bottom clamp for positively moving said clamp away from said mandrel as said slide is moved to its lower position.

18. In a cup making machine the combination comprising a frame, a turret carrying a plurality of mandrels and supported for indexing movement relative to said frame about a given axis to bring said mandrels in succession to a work station fixed relative to said frame, a pair of folding wings at said work station supported for pivotal movement about a common axis fixed relative to said frame and located below and parallel with the axis of a mandrel positioned at said work station, said folding wings being movable between a lowered spread position to a raised closed position relative to said mandrel, said folding wings further being adapted to engage a sidewall blank initially positioned beneath said mandrel and to fold said blank around said mandrel during movement from said spread to said closed position and said folding wings being so shaped as to surround the major portion of said mandrel and to hold the folded blank thereon when in their closed position, means for moving said folding wings between said lowered and raised positions in synchronism with the indexing movement of said turret, said fixed axis being defined by a pivot pin passing through apertured portions of said folding wings, a bracket supporting said pivot pin, and means for attaching said bracket to said frame which means is so constructed as to permit limited adjustment of said bracket in all directions relative to said frame so as to allow said pivot pin to be initially accurately set to a desired relationship relative to the axis of a mandrel positioned at said work station.

19. The combination defined in claim 18 further characterized by said attaching means comprising an L-shaped member having one leg connected with said frame by threaded fasteners passing through oversized holes in one of the connected parts and having its other leg connected with said bracket by threaded fasteners passing through oversized holes in one of the connected parts.

20. In a cup making machine the combination comprising a frame, a turret carrying a plurality of mandrels and supported for indexing movement relative to said frame about a given axis to bring said mandrels in succession to a work station fixed relative to said frame, a pair of folding wings at said work station supported for pivotal movement about a common axis fixed relative to said frame and located below and parallel with the axis of a mandrel positioned at said work station, said folding wings being movable between a lowered spread position to a raised closed position relative to said mandrel, said folding wings further being adapted to engage a sidewall blank initially positioned beneath said mandrel and to fold said blank around said mandrel during movement from said spread to said closed position and said folding wings being so shaped as to surround the major portion of said mandrel and to hold the folded blank thereon when in their closed position, means for moving said folding wings between said lowered and raised positions in synchronism with the indexing movement of said turret, said means for moving said folding wings comprising a slide located below said pivot axis and vertically movable relative to said frame between upper and lower positions, two eyes fixed to said slide, two generally vertical actuating rods each pivotally connected at its upper end to a respective one of said folding wings and having a lower portion slidably received in a respective one of said eyes, each of said rods also including means providing a spring seat near the upper end thereof, two helical compression springs each received on a respective one of said actuating rods between its spring seat and the associated eye whereby upward movement of said slide is transferred by said eyes through said springs to said actuating rods, a bottom clamp located below a mandrel positioned at said work station and movable vertically toward and away from said mandrel independently of said folding wings, spring biasing means for urging said clamp toward said mandrel and into clamping relationship with said mandrel and with a sidewall blank positioned between said clamp and said mandrel, a depending actuating member connected with said clamp, means defining an abutment surface on said slide, and a stop element carried by said depending member and engageable with said abutment surface to cause said depending member to draw said clamp from said mandrel as said slide moves toward its lower position, said stop element being vertically adjustable relative to said depending element.

21. In a cup making machine the combination comprising a frame, a turret carrying a plurality of mandrels and supported for indexing movement relative to said frame about a given axis to bring said mandrels in succession to a work station fixed relative to said frame, a pair of folding wings at said work station supported for pivotal movement about a common axis fixed relative to said frame and located below and parallel with the axis of a mandrel positioned at said work station, said folding wings being movable between a lowered spread position to a raised closed position relative to said mandrel, said folding wings further being adapted to engage a sidewall blank initially positioned beneath said mandrel and to fold said blank around said mandrel during movement from said spread to said closed position and said folding wings being so shaped as to surround the major portion of said mandrel and to hold the folded blank thereon when in their closed position, means for moving said folding wings between said lowered and raised positions in synchronism with the indexing movement of said turret, said means for moving said folding wings comprising a slide located below said pivot axis and vertically movable relative to said frame between upper and lower positions, two eyes fixed to said slide, two generally vertical actuating rods each pivotally connected at its upper end to a respective one of said folding wings and having a lower portion slidably received in a respective one of said eyes, each of said rods also including means providing a spring seat near the upper end thereof, two helical compression springs each received on a respective one of said actuating rods between its spring seat and the associated eye whereby upward movement of said slide is transferred by said eyes through said springs to said actuating rods, a bottom clamp located below a mandrel positioned at said work station and movable vertically toward and away from said mandrel independently of said folding wings, a depending actuating rod connected with said clamp, a cross piece fixed relative to the frame and having a vertical opening through which said rod extends, a helical compression spring received on said rod between said cross piece and a seat fixed relative to said rod for urging said rod upwardly to move said clamp toward said mandrel, means defining an abutment surface on said slide located below said cross piece, and a stop element carried by said depending member and engageable with said abutment surface to cause said depending member to draw said clamp from said mandrel as said slide moves toward its lower position, said stop element being vertically adjustable relative to said depending element.

22. In a cup making machine the combination comprising a frame, a turret carrying a plurality of mandrels and supported for indexing movement relative to said frame about a given axis to bring said mandrels in succession to a work station fixed relative to said frame, a pivot pin located below and parallel with a mandrel positioned at said work station, a pair of folding wings having portions pivotally received on said pivot pin for movement of said wings between spread and closed positions relative to said mandrel, a bottom clamp located below a mandrel at said work station and including a depending stem having a vertically elongated guide opening therein which receives said pivot pin, means defining a pair of spaced vertical guide surfaces fixed relative to said frame, and a roller rotatably supported on said stem in vertically spaced relation to said elongated guide opening and received between said two guide surfaces, said roller and said pivot pin in cooperation with said elongated opening and said spaced guide surfaces serving to guide said stem and clamp for straight line vertical movement.

23. The combination defined in claim 22 further characterized by means for adjusting said pivot pin relative to said frame.

References Cited by the Examiner
UNITED STATES PATENTS

| | | | |
|---|---|---|---|
| 1,365,679 | 1/1921 | Garrett | 93—47 |
| 1,766,420 | 6/1930 | Wessman et al. | 93—39.3 |
| 1,967,689 | 7/1934 | Schauer et al. | |
| 1,973,406 | 9/1934 | Cooley | 93—39.3 |
| 2,446,649 | 8/1948 | Gregory | 93—47 |
| 2,546,621 | 3/1951 | Wixon et al. | 93—39.3 |
| 2,796,776 | 6/1957 | Locke et al. | 74—822 |
| 2,864,612 | 12/1958 | Dellinger et al. | 93—39.3 X |
| 2,942,530 | 6/1960 | Bodendoerfer | 93—39.3 X |

BERNARD STICKNEY, *Primary Examiner.*